US012634680B2

(12) United States Patent
    Zhuang

(10) Patent No.: US 12,634,680 B2
(45) Date of Patent: May 19, 2026

(54) UE CAPABILITY REPORTING METHOD AND APPARATUS

(71) Applicant: HONOR DEVICE CO., LTD., Shenzhen (CN)

(72) Inventor: Hongcheng Zhuang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 164 days.

(21) Appl. No.: 17/928,775

(22) PCT Filed: Oct. 29, 2021

(86) PCT No.: PCT/CN2021/127428
     § 371 (c)(1),
     (2) Date: Nov. 30, 2022

(87) PCT Pub. No.: WO2022/166279
     PCT Pub. Date: Aug. 11, 2022

(65) Prior Publication Data
     US 2024/0244420 A1     Jul. 18, 2024

(30) Foreign Application Priority Data

Feb. 2, 2021    (CN) .......................... 202110144299.8
Mar. 2, 2021    (CN) .......................... 202110232222.6

(51) Int. Cl.
     *H04W 8/22*         (2009.01)
     *H04W 36/00*        (2009.01)
     *H04W 76/20*        (2018.01)
(52) U.S. Cl.
     CPC ..... *H04W 8/22* (2013.01); *H04W 36/008355* (2023.05); *H04W 76/20* (2018.02)
(58) Field of Classification Search
     CPC ................... H04W 8/22; H04W 76/20; H04W 36/008355
     See application file for complete search history.

(56) References Cited

U.S. PATENT DOCUMENTS 9,961,542 B2    5/2018    Rajadurai et al.
10,966,165 B2   3/2021    Papasakellariou et al.
                (Continued)

FOREIGN PATENT DOCUMENTS

CN      101296023 A      10/2008
CN      101640879 A      2/2010
                (Continued)

OTHER PUBLICATIONS

English translation for WO_2017133305_A1_Wu (Year: 2017).*
                (Continued)

*Primary Examiner* — Sujoy K Kundu
*Assistant Examiner* — Weibin Huang
(74) *Attorney, Agent, or Firm* — Fish & Richardson P.C.

(57)         ABSTRACT

A UE capability reporting method is provided to resolve a problem that when UE is handed over from a source access network device to a target access network device, UE capability information obtained by the target access network device is incomplete. A solution is as follows: UE obtains first information, where the first information is used to indicate a UE capability supported by a target access network device; and the UE reports second information based on the UE capability supported by the target access network device and a UE capability of the UE, where the second information includes capability information, other than UE capability information stored in a source access network device, in target capability information, and the target capability information is UE capability information of a lower UE capability in the UE capability of the UE and the UE capability supported by the target access network device.

16 Claims, 10 Drawing Sheets

(56) References Cited

U.S. PATENT DOCUMENTS

| | | | |
|---|---|---|---|
| 11,323,920 | B2 | 5/2022 | Shi et al. |
| 2013/0039287 | A1 | 2/2013 | Rayavarapu et al. |
| 2013/0039339 | A1 | 2/2013 | Rayavarapu et al. |
| 2015/0117400 | A1* | 4/2015 | Gopal ............... H04W 36/0022 |
| | | | 370/331 |
| 2018/0227737 | A1 | 8/2018 | Wu |
| 2019/0037385 | A1* | 1/2019 | Li ..................... H04W 36/0016 |
| 2020/0187189 | A1 | 6/2020 | Raghunathan et al. |
| 2020/0404545 | A1* | 12/2020 | Yang ........................ H04W 8/24 |
| 2021/0092654 | A1* | 3/2021 | Kadiri ............... H04W 36/0061 |
| 2021/0105673 | A1* | 4/2021 | Jassal .................. H04W 36/185 |
| 2022/0104097 | A1 | 3/2022 | Hu et al. |

FOREIGN PATENT DOCUMENTS

| | | | | |
|---|---|---|---|---|
| CN | 101938797 A | | 1/2011 | |
| CN | 101971655 A | | 2/2011 | |
| CN | 102340844 A | | 2/2012 | |
| CN | 102647693 A | | 8/2012 | |
| CN | 102932765 A | | 2/2013 | |
| CN | 103533587 A | | 1/2014 | |
| CN | 107040355 A | * | 8/2017 | ........ H04W 72/0453 |
| CN | 107734573 A | | 2/2018 | |
| CN | 109257741 A | | 1/2019 | |
| CN | 111757343 A | | 10/2020 | |
| CN | 112087755 A | | 12/2020 | |
| CN | 112153633 A | | 12/2020 | |
| CN | 112218288 A | * | 1/2021 | ........ H04W 36/0055 |
| EP | 3358872 A1 | | 8/2018 | |
| EP | 3968679 A1 | | 3/2022 | |
| WO | 2015108388 A1 | | 7/2015 | |
| WO | WO-2017133305 A1 | * | 8/2017 | |

OTHER PUBLICATIONS

English translation for CN_107040355_A_Wu (Year: 2017).*

English translation for CN_112218288_A_Li (Year: 2021).*

English translation for CN_107040355_A (Year: 2017).*

Vodafone, "Future proofing UE Radio Capability handling," 3GPP TSG SA WG2 #127, S2-183768, Sanya, China, Apr. 16-20, 2018, 2 pages.

ZTE Corporation, "Discussion on backward compatible capability signaling forwarding," 3GPP TSG-RAN WG2 Meeting #93, R2-161348, St. Julian's, Malta, Feb. 15-19, 2016, 3 pages.

MCC, "RAN4#83 Meeting Report," 3GPP TSG-RAN WG4 Meeting #84, R4-1707001, Berlin, Germany, Aug. 21-25, 2017, 596 pages.

* cited by examiner

Step 301

Determine whether UE capability information needs to be obtained again

N

Y

Step 302

UE obtains first information

Step 303

The UE reports second information based on a UE capability of the UE and a UE capability supported by a target access network device

UE

Target access network device

Source access network device

UE CAPABILITY REPORTING METHOD AND APPARATUS

CROSS REFERENCE TO RELATED APPLICATIONS

This application is a national stage of International Application No. PCT/CN2021/127428, filed on Oct. 29, 2021 which claims priority to Chinese Patent Application No. 202110144299.8, filed on Feb. 2, 2021 and Chinese Patent Application No. 202110232222.6, filed on Mar. 2, 2021. The disclosures of all the aforementioned applications are hereby incorporated by reference in their entireties.

TECHNICAL FIELD

Embodiments of this application relate to the field of communications technologies, and in particular, to a user equipment (user equipment, UE) capability reporting method and an apparatus.

BACKGROUND

In long term evolution (long term evolution, LTE) and new radio (new radio. NR) systems, as specified in a 3rd Generation Partnership Project (3rd generation partnership project, 3GPP) protocol, UE reports UE capability (UE capability) information to an access network device by using a radio resource control (radio resource control, RRC) message, and the access network device performs a transmission parameter configuration or the like based on an obtained UE capability.

Due to movement of the UE, the UE needs to access various access network devices that are of different protocol releases and have different processing capabilities, such as access network devices supporting an LTE technology or access network devices supporting an NR technology in a 5G non-standalone (non-standalone, NSA) system or access network devices that are of different protocol releases and support an NR technology in a 5G standalone (standalone, SA) system. After the UE receives a UE capability enquiry request from the access network device, the UE sends all capability information. As a result, a large quantity of UE capability fields need to be carried in UE capability reporting. If the access network device or system accessed by the UE does not support corresponding functions, corresponding fields in the UE capability reporting are redundant, and waste of air interface resources is caused.

To reduce the waste of air interface resources, the UE may report only UE capability information that matches a protocol release and capability of the access network device. However, when the UE moves and is handed over from a source access device to a target access network device, because UE capability information matching the target access network device is different from UE capability information matching the source access network device, UE capability information obtained by the target access network device from the source access network device may be incomplete.

SUMMARY

Embodiments of this application provide a UE capability reporting method and an apparatus to resolve a problem that when UE is handed over from a source access network device to a target access network device, UE capability information obtained by the target access network device is incomplete.

To achieve the foregoing objective, the following technical solutions are used in the embodiments of this application:

According to a first aspect, a UE capability reporting method is provided, where the method includes: obtaining, by UE, first information used to indicate a UE capability supported by a target access network device; and reporting second information based on the UE capability supported by the target access network device and a UE capability of the UE, where the second information includes capability information, other than UE capability information stored in a source access network device, in target capability information, and the target capability information is UE capability information of a lower UE capability in the UE capability of the UE and the UE capability supported by the target access network device, that is, the UE determines UE capability information matching the target access network device, and reports only capability information other than the UE capability information stored in the source access network device, in the UE capability information matching the target access network device.

Based on the method in the first aspect, the target access network device can obtain the capability information other than the UE capability information stored in the source access network device, to ensure integrity of the UE capability information. In addition, the UE reports only the capability information other than the UE capability information stored in the source access network device, in the UE capability information matching the target access network device. In comparison with a requirement for reporting complete UE capability information matching a target access network device, an amount of the reported capability information is smaller. Therefore, power consumption of the UE can be reduced, transmission resources can be reduced, and a reporting rate of the UE capability information can be increased.

In a possible design, the method further includes: when the UE capability of the UE is higher than a UE capability supported by the source access network device and the UE capability supported by the target access network device is higher than the UE capability supported by the source access network device, determining, by the UE, to report the second information, that is, the UE compares the UE capability of the UE, the UE capability supported by the source access network device, and the UE capability supported by the target access network device, to determine whether to report the second information. This reduces a delay caused by learning, through signaling interaction, whether the second information needs to be reported.

In a possible design, the method further includes: receiving, by the UE, third information used to instruct the UE to report the second information, that is, the UE can determine, based on information received from another network element, that the UE needs to report the second information. This reduces power consumption caused by comparing, by the UE, the UE capability of the UE, the UE capability supported by the source access network device, and the UE capability supported by the target access network device, to determine whether to report the second information.

In a possible design, the third information may be carried in a radio resource control (radio resource control, RRC) connection reconfiguration sent by the source access network device to the UE. Because the third information is sent by using an existing signaling message, signaling overheads are reduced.

In a possible design, the method further includes: receiving, by the UE, an RRC connection reconfiguration from the source access network device, where the RRC connection reconfiguration carries the first information; and the reporting, by the UE, second information includes: sending, by the UE, an RRC connection reconfiguration complete carrying the second information to the target access network device, that is, the UE reports the second information in a process of handover from the source access network device to the target access network device. Because second signaling is reported by using an existing procedure and no signaling message needs to be added, signaling overheads are reduced.

In a possible design, the method further includes: receiving, by the UE, a UE capability enquiry request from the target access network device, where the UE capability enquiry request carries the first information; and sending, by the UE, a UE capability enquiry response carrying the second information to the target access network device, that is, the UE reports the second information to the target access network device when the target access network device enquires the UE capability of the UE. Because second signaling is reported by using an existing procedure and no signaling message needs to be added, signaling overheads are reduced.

In a possible design, the method further includes: receiving, by the UE, a UE capability enquiry request from the source access network device, where the UE capability enquiry request carries the first information; and sending, by the UE, a UE capability enquiry response carrying the second information to the source access network device, that is, the UE reports the second information to the source access network device when the source access network device enquires the UE capability of the UE, so that the source access network device combines the second information and the UE capability information corresponding to the UE and stored in the source access network device and reports the combined information to the target access network device, without adding a signaling message. This reduces signaling overheads and simplifies a system design.

In a possible design, the UE capability enquiry request further carries fourth information used to indicate the UE capability supported by the source access network device, so that the UE determines, based on the UE capability supported by the source access network device, the UE capability of the UE, and the UE capability supported by the target access network device, whether the second information needs to be reported. This simplifies the system design and also reduces complexity of obtaining, by the UE, the UE capability supported by the source access network device.

According to a second aspect, this application provides a communications apparatus, where the communications apparatus may be UE or a chip or system-on-chip in UE, or may be a functional module that is in the communications apparatus and configured to implement the method in the first aspect or any possible design of the first aspect. The communications apparatus can implement a function performed by the communications apparatus in the foregoing aspect or each possible design. The function may be implemented by hardware executing corresponding software. The hardware or software includes one or more modules corresponding to the foregoing functions. For example, the communications apparatus may include a processing unit and a transceiver unit.

The processing unit is configured to control the transceiver unit to obtain first information used to indicate a UE capability supported by a target access network device.

The processing unit is further configured to control the transceiver unit to report second information based on the UE capability supported by the target access network device and a UE capability of the UE, where the second information includes capability information, other than UE capability information stored in a source access network device, in target capability information, and the target capability information is UE capability information of a lower UE capability in the UE capability of the UE and the UE capability supported by the target access network device.

The processing unit may control the transceiver unit to send the second information to the target access network device in a UE handover process, or to send the second information to the target access network device in a UE capability enquiry process, or to send the second information in a UE capability enquiry process and a UE handover process.

Specifically, for a specific implementation of the communications apparatus, refer to the behavior or function of the UE in the UE capability reporting method provided in the first aspect or any possible design of the first aspect. Details are not described herein again. Therefore, the UE provided in the second aspect achieves the same beneficial effects as that in the first aspect or any possible design of the first aspect.

According to a third aspect, a communications apparatus is provided, where the communications apparatus may be UE or a chip or system-on-chip in UE. The communications apparatus can implement a function performed by the UE in the foregoing aspect or each possible design. The function may be implemented by hardware. In a possible design, the communications apparatus may include a processor and a communications interface, where the processor may be configured to support the communications apparatus in implementing the function in the first aspect or any possible design of the first aspect. For example, the processor is configured to control the communications interface to obtain first information used to indicate a UE capability supported by a target access network device, and control the communications interface to report second information based on the UE capability supported by the target access network device and a UE capability of the UE, where the second information includes capability information, other than UE capability information stored in a source access network device, in target capability information, and the target capability information is UE capability information of a lower UE capability in the UE capability of the UE and the UE capability supported by the target access network device. In another possible design, the communications apparatus may further include a memory, where the memory is configured to store a computer-executable instruction and data required by the communications apparatus. When the communications apparatus runs, the processor executes the computer-executable instruction stored in the memory, so that the communications apparatus performs the UE capability reporting method according to the first aspect or any possible design of the first aspect.

According to a fourth aspect, a communications apparatus is provided, where the communications apparatus may be UE or a chip or system-on-chip in UE, and the communications apparatus includes one or more processors and one or more memories. The one or more memories are coupled to the one or more processors, the one or more memories are configured to store computer program code, the computer program code includes a computer instruction, and when the one or more processors execute the computer instruction, the communications apparatus is enabled to perform the UE capability reporting method according to the first aspect or any possible design of the first aspect.

According to a fifth aspect, a computer program product including an instruction is provided, where when the computer program product runs on a computer, the computer is enabled to perform the UE capability reporting method according to the first aspect or any possible design of the first aspect.

According to a sixth aspect, a computer-readable storage medium is provided, where the computer-readable storage medium may be a readable non-volatile storage medium, the computer-readable storage medium stores an instruction, and when the instruction is run on a computer, the computer is enabled to perform the UE capability reporting method according to the first aspect or any possible design of the first aspect.

For technical effects brought by any design of the third aspect to the sixth aspect, refer to the technical effects brought by the first aspect or any possible design of the first aspect. Details are not described herein again.

According to a seventh aspect, a UE capability reporting method is provided, where the method includes: sending, by a source access network device, first information used to indicate a UE capability supported by a target access network device to UE, so that the UE reports second information based on the UE capability supported by the target access network device and a UE capability of the UE, where the second information includes capability information, other than UE capability information stored in the source access network device, in target capability information, that is, the UE reports only capability information other than the UE capability information stored in the source access network device, in UE capability information matching the target access network device.

In a possible design, the method further includes: receiving, by the source access network device, a handover request acknowledge from the target access network device, where the handover request acknowledge carries the first information; and sending, by the source access network device, an RRC connection reconfiguration carrying the first information to the UE. That is, the source access network device sends the first information to the UE in a process of handover from the source access network device to the target access network device. Because the first information is sent by using an existing procedure and no signaling message needs to be added, signaling overheads are reduced.

In a possible design, the sending, by a source access network device, first information to UE includes: sending, by the source access network device, a UE capability enquiry request carrying the first information to the UE; and the method further includes: receiving, by the source access network device, a UE capability enquiry response from the UE, where the UE capability enquiry response carries second information, the second information includes the capability information, other than the UE capability information stored in the source access network device, in the target capability information, and the target capability information is UE capability information of a lower UE capability in the UE capability of the UE and the UE capability supported by the target access network device; and sending, by the source access network device, a handover request carrying the second information and the UE capability information stored in the source access network device to the target access network device.

Based on the possible design, the source access network device sends the first information to the UE when enquiring the UE capability of the UE, and receives the second information from the UE. The source access network device combines the second information and the UE capability information corresponding to the UE and stored in the source access network device and reports the combined information to the target access network device, to ensure integrity of the UE capability information. In addition, because no signaling message needs to be added, signaling overheads are reduced, and a system design is simplified.

In a possible design, the method further includes: when the UE capability of the UE is higher than a UE capability supported by the source access network device and the UE capability supported by the target access network device is higher than the UE capability supported by the source access network device, sending, by the source access network device, third information to the UE, where the third information is used to instruct the UE to report the second information. That is, the source access network device may instruct the UE to report the second information. This reduces power consumption caused by comparing, by the UE, the UE capability of the UE, the UE capability supported by the source access network device, and the UE capability supported by the target access network device, to determine whether to report the second information.

According to an eighth aspect, this application provides a communications apparatus, where the communications apparatus may be a source access network device or a chip or system-on-chip in a source access network device, or may be a functional module that is in the communications apparatus and configured to implement the method in the seventh aspect or any possible design of the seventh aspect. The communications apparatus can implement a function performed by the communications apparatus in the foregoing aspect or each possible design. The function may be implemented by hardware executing corresponding software. The hardware or software includes one or more modules corresponding to the foregoing functions. For example, the communications apparatus may include a processing unit and a transceiver unit.

The processing unit is configured to control the transceiver unit to send first information used to indicate a UE capability supported by a target access network device to UE, so that the UE reports second information based on the UE capability supported by the target access network device and a UE capability of the UE, where the second information includes capability information, other than UE capability information stored in the source access network device, in target capability information.

The processing unit may control the transceiver unit to send the first information in a UE handover procedure, or to send the first information in a UE capability enquiry procedure.

Specifically, for a specific implementation of the communications apparatus, refer to the behavior or function of the source access network device in the UE capability reporting method provided in the seventh aspect or any possible design of the seventh aspect. Details are not described herein again. Therefore, the source access network device provided in the eighth aspect achieves the same beneficial effects as that in the seventh aspect or any possible design of the seventh aspect.

According to a ninth aspect, a communications apparatus is provided, where the communications apparatus may be a source access network device or a chip or system-on-chip in a source access network device. The communications apparatus can implement a function performed by the source access network device in the foregoing aspect or each possible design. The function may be implemented by hardware. In a possible design, the communications apparatus may include a processor and a communications interface, where the processor may be configured to support the communications apparatus in implementing the function in the seventh aspect or any possible design of the seventh aspect. For example, the processor is configured to control the communications interface to send first information used to indicate a UE capability supported by a target access network device to UE, so that the UE reports second information based on the UE capability supported by the target access network device and a UE capability of the UE, where the second information includes capability information, other than UE capability information stored in the source access network device, in target capability information. In another possible design, the communications apparatus may further include a memory, where the memory is configured to store a computer-executable instruction and data required by the communications apparatus. When the communications apparatus runs, the processor executes the computer-executable instruction stored in the memory, so that the communications apparatus performs the UE capability reporting method according to the seventh aspect or any possible design of the seventh aspect.

According to a tenth aspect, a communications apparatus is provided, where the communications apparatus may be a source access network device or a chip or system-on-chip in a source access network device, and the communications apparatus includes one or more processors and one or more memories. The one or more memories are coupled to the one or more processors, the one or more memories are configured to store computer program code, the computer program code includes a computer instruction, and when the one or more processors execute the computer instruction, the communications apparatus is enabled to perform the UE capability reporting method according to the seventh aspect or any possible design of the seventh aspect.

According to an eleventh aspect, a computer program product including an instruction is provided, where when the computer program product runs on a computer, the computer is enabled to perform the UE capability reporting method according to the seventh aspect or any possible design of the seventh aspect.

According to a twelfth aspect, a computer-readable storage medium is provided, where the computer-readable storage medium may be a readable non-volatile storage medium, the computer-readable storage medium stores an instruction, and when the instruction is run on a computer, the computer is enabled to perform the UE capability reporting method according to the seventh aspect or any possible design of the seventh aspect.

For technical effects brought by any design of the ninth aspect to the twelfth aspect, refer to the technical effects brought by the seventh aspect or any possible design of the seventh aspect. Details are not described herein again.

According to a thirteenth aspect, a UE capability reporting method is provided. In a first solution of the thirteenth aspect, the method includes: sending, by a target access network device, first information used to indicate a UE capability supported by the target access network device; and receiving, by the target access network device, second information from UE.

In a second solution of the thirteenth aspect, the method includes: receiving, by a target access network device, a handover request from a source access network device, where the handover request carries second information and UE capability information stored in the source access network device; and sending a handover request acknowledge to the source access network device.

The second information includes capability information, other than UE capability information stored in the source access network device, in target capability information, and the target capability information is UE capability information of a lower UE capability in a UE capability of the UE and a UE capability supported by the target access network device.

Based on the method in the thirteenth aspect, the target access network device may receive, from the UE, capability information other than the UE capability information stored in the source access network device, in UE capability information matching the target access network device, and combine the capability information received from the UE and the UE capability information stored in the source access network device and obtained by the target access network device from the source access network device into complete UE capability information matching the target access network device. In addition, an amount of the capability information reported by the UE to the target access network device is smaller. Therefore, power consumption of the UE can be reduced, transmission resources can be reduced, and a reporting rate of the UE capability information can be increased.

With reference to the first solution of the thirteenth aspect, in a possible design, the sending, by a target access network device, first information includes: sending, by the target access network device, a handover request acknowledge carrying the first information to the source access network device; and receiving, by the target access network device, an RRC connection reconfiguration complete from the UE, where the RRC connection reconfiguration complete carries the second information. That is, the UE sends the first information and receives the second information in a process of handover from the source access network device to the target access network device. Because no signaling message needs to be added, signaling overheads are reduced.

With reference to the first solution of the thirteenth aspect, in a possible design, the target access network device sends a UE capability enquiry request carrying the first information to the UE; and the target access network device receives a UE capability enquiry response from the UE, where the UE capability enquiry response carries the second information, that is, the target access network device sends the first information when enquiring the UE capability of the UE, and receives the second information from the UE. Because an existing procedure is used and no signaling message needs to be added, signaling overheads are reduced, and a system design is simplified.

With reference to the first solution of the thirteenth aspect, in a possible design, the sending, by a target access network device, first information includes: when the UE capability of the UE is higher than a UE capability supported by the source access network device and the UE capability supported by the target access network device is higher than the UE capability supported by the source access network device, determining, by the target access network device, to obtain the second information, and sending, by the target access network device, the first information.

According to a fourteenth aspect, this application provides a communications apparatus, where the communications apparatus may be a target access network device or a chip or system-on-chip in a target access network device, or may be a functional module that is in the communications apparatus and configured to implement the method in the thirteenth aspect or any possible design of the thirteenth aspect. The communications apparatus can implement a function performed by the communications apparatus in the foregoing aspect or each possible design. The function may be implemented by hardware executing corresponding software. The hardware or software includes one or more modules corresponding to the foregoing functions. For example, the communications apparatus may include a processing unit and a transceiver unit.

The processing unit is configured to control the transceiver unit to send first information used to indicate a UE capability supported by the target access network device, and to receive second information from UE; or the processing unit is configured to control the transceiver unit to receive a handover request from a source access network device, where the handover request carries second information and UE capability information stored in the source access network device, and to send a handover request acknowledge to the source access network device.

For a specific implementation of the communications apparatus, refer to the behavior or function of the target access network device in the UE capability reporting method provided in the thirteenth aspect or any possible design of the thirteenth aspect. Details are not described herein again. The target access network device provided in the fourteenth aspect achieves the same beneficial effects as that in the thirteenth aspect or any possible design of the thirteenth aspect.

According to a fifteenth aspect, a communications apparatus is provided, where the communications apparatus may be a target access network device or a chip or system-on-chip in a target access network device. The communications apparatus can implement a function performed by the target access network device in the foregoing aspect or each possible design. The function may be implemented by hardware. In a possible design, the communications apparatus may include a processor and a communications interface. The processor may be configured to support the communications apparatus in implementing the function in the thirteenth aspect or any possible design of the thirteenth aspect. For example, the processing unit is configured to control the communications interface to send first information used to indicate a UE capability supported by the target access network device, and to receive second information from UE. Alternatively, the processing unit is configured to control the communications interface to receive a handover request from a source access network device, where the handover request carries second information and UE capability information stored in the source access network device, and to send a handover request acknowledge to the source access network device. In another possible design, the communications apparatus may further include a memory, where the memory is configured to store a computer-executable instruction and data required by the communications apparatus. When the communications apparatus runs, the processor executes the computer-executable instruction stored in the memory, so that the communications apparatus performs the UE capability reporting method according to the thirteenth aspect or any possible design of the thirteenth aspect.

According to a sixteenth aspect, a communications apparatus is provided, where the communications apparatus may be a target access network device or a chip or system-on-chip in a target access network device, and the communications apparatus includes one or more processors and one or more memories. The one or more memories are coupled to the one or more processors, the one or more memories are configured to store computer program code, the computer program code includes a computer instruction, and when the one or more processors execute the computer instruction, the communications apparatus is enabled to perform the method according to the thirteenth aspect or any possible design of the thirteenth aspect.

According to a seventeenth aspect, a computer program product including an instruction is provided, where when the computer program product runs on a computer, the computer is enabled to perform the UE capability reporting method according to the thirteenth aspect or any possible design of the thirteenth aspect.

According to an eighteenth aspect, a computer-readable storage medium is provided, where the computer-readable storage medium may be a readable non-volatile storage medium, the computer-readable storage medium stores an instruction, and when the instruction is run on a computer, the computer is enabled to perform the UE capability reporting method according to the thirteenth aspect or any possible design of the thirteenth aspect.

For technical effects brought by any design manner of the fifteenth aspect to the eighteenth aspect, refer to the technical effects brought by the thirteenth aspect or any possible design of the thirteenth aspect. Details are not described herein again.

According to a nineteenth aspect, an embodiment of this application provides a communications system, where the communications system may include the communications apparatus according to any one of the second aspect to the fourth aspect, the communications apparatus according to any one of the eighth aspect to the tenth aspect, and the communications apparatus according to any one of the fourteenth aspect to the sixteenth aspect.

DETAILED DESCRIPTION OF EMBODIMENTS

Figure 1:
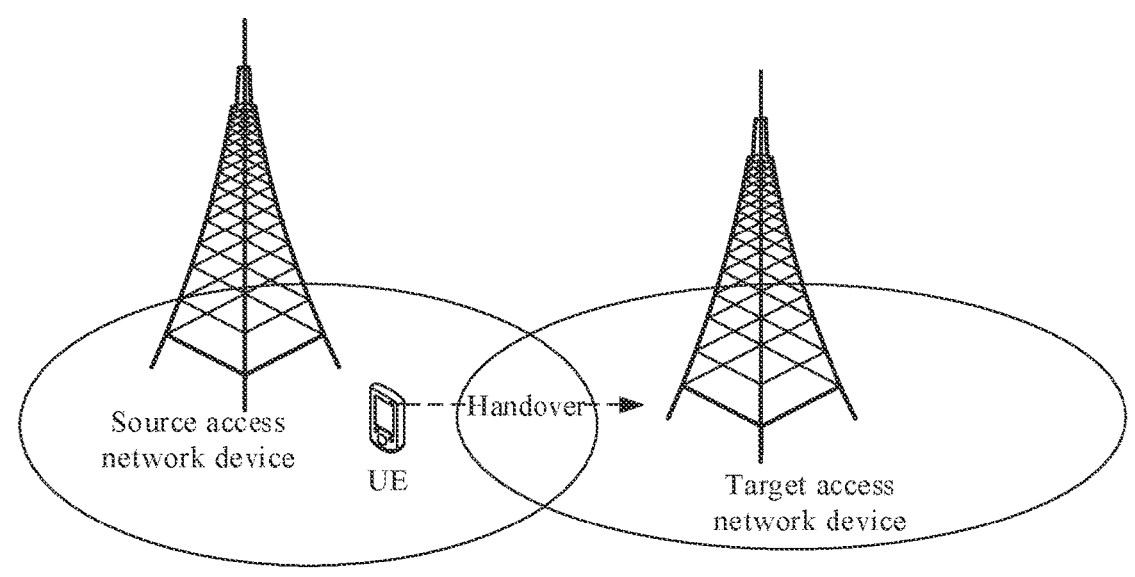
FIG. 1 is a schematic diagram of a communications system according to an embodiment of this application.

To facilitate understanding of the methods provided in the embodiments of this application, the following describes the technical terms used in the embodiments of this application.

A UE capability (UE capability) may be a communication capability of UE (such as a network capability of the UE and a wireless access capability of the UE) for performing network communication between the UE and a network-side device. Different UE capabilities may correspond to different communication capabilities. A higher UE capability means a higher communication capability. UE capabilities of UEs of different protocol releases/types may be different. UE capabilities supported by network-side devices (such as access network devices) of different protocol releases may be different.

UE capability information (UE capability information) may represent a UE capability Specifically, the UE capability information may include a radio access technology (radio access technology, RAT), a protocol release (release), capability parameters, and the like. One RAT may correspond to one or more protocol releases. In a same RAT, capability parameters included in UE capability information corresponding to different protocol releases may be the same or different. In different protocol releases in the same RAT, parameter values corresponding to same capability parameters may be the same or different.

The RAT may include but is not limited to LTE, NR, or another RAT that emerges later with evolution of a communications system.

Protocol releases may be 3GPP protocol releases, which may include 3GPP protocol releases R8, R9, R10, R11, R12, R13, R14, R15, R16, R17, R18, and the like, and may also include other protocol releases that emerge later with the evolution of the communications system. In the same RAT, if a number of a protocol release is larger, it means that a UE capability corresponding to the protocol release is higher, and the protocol release is a later protocol release; or conversely, if a number of a protocol release is smaller, a UE capability corresponding to the protocol release is lower, and the protocol release is an earlier protocol release. For example, assuming that the RAT is LTE, in LTE R8 and R9, R9 is a later protocol release and R8 is an earlier protocol release. Optionally, in the same RAT, a later protocol release can be compatible with an earlier protocol release, and a UE capability corresponding to the later protocol release is higher than a UE capability corresponding to the earlier protocol release. In addition to the UE capability corresponding to the earlier protocol, the UE capability corresponding to the later protocol release additionally includes other UE capabilities. UE capability information of the UE capability corresponding to the earlier protocol release is included in UE capability information of the UE capability corresponding to the later protocol release. In addition to the UE capability information of the UE capability corresponding to the earlier protocol release, the UE capability information of the UE capability corresponding to the later protocol release further includes other additional capability information.

It should be understood that a protocol release of a device (such as a protocol release of UE, a protocol release of a source access device, and a protocol release of a target access network device) described in the embodiments of this application may be a latest protocol release supported by the device. For example, using the UE as an example, if the protocol release of the UE described hereinafter is R15, it represents that a latest protocol release of the UE is R15, and the UE can have UE capabilities corresponding to all protocol releases earlier than R15.

Capability parameters may include a UE category (such as ue-Class or ue-Category), service data adaptation protocol (service data adaptation protocol) parameters (sdap-Parameters), packet data convergence protocol (packet data convergence protocol. PDCP) parameters (pdcp-Parameters), radio frequency parameters (rf-Parameters), feature group indicators (Feature group indicators), a supported maximum bandwidth (maximum bandwidth. MAX BW), a minimum bandwidth, an application scenario, a peak rate, a maximum modulation order, a duplex capability, an antenna quantity, a supported power level, a processing time, whether to support a supplementary uplink (supplementary uplink, SUL), whether to support carrier aggregation (carrier aggregation, CA), a CA capability, and the like. The UE category may include but is not limited to enhanced mobile broadband (enhance mobile broadband, eMBB) UE, machine type communication (machine type communications, MTC) UE, reduced capability (reduced capability. REDCAP) UE, or the like.

For example, assuming that the UE capability information includes the RAT, the protocol release, and the capability parameters, the following Table 1 shows correspondences between RATs, protocol releases, and capability parameters in different UE capability information. As shown in the following Table 1, LTE R15 and LTE R16 correspond to same capability parameters, but values of the same capability parameters may be different. NR R15 and NR R16 correspond to same capability parameters, but values of the same capability parameters may be different. LTE R15 and NR R15 correspond to different capability parameters. LTE R16 and NR R16 correspond to different capability parameters.

TABLE 1

| RAT | Protocol release | Capability parameter |
|---|---|---|
| LTE | R15 | ue-Category, pdcp-Parameters, rf-Parameters, Feature group indicators, . . . |
| LTE | R16 | ue-Category, pdcp-Parameters, rf-Parameters, Feature group indicators, . . . |
| LTE | . . . | . . . |
| NR | R15 | sdap-Parameters, pdcp-Parameters, rf-Parameters, Feature group indicators, . . . |
| NR | R16 | sdap-Parameters, pdcp-Parameters, rf-Parameters, Feature group indicators, . . . |
| . . . | . . . | . . . |

It should be understood that Table 1 is only an exemplary table. In addition to the content shown in Table 1, other RATs, protocol releases, capability parameters, and the like may also be included. This is not limited in this application. For example, in Table 1, the symbol " . . . " in the column corresponding to RAT replaces other RATs, the symbol " . . . " in the protocol release column replaces other protocol releases, and the symbol " . . . " in the list corresponding to the capability parameters replaces other capability parameters.

In the prior art, to reduce air interface overheads for UE capability reporting, UE reports only UE capability information matching an access network device currently serving the UE, and does not report all UE capability information. Therefore, although the overheads for UE capability reporting can be reduced, when the UE is handed over from a source access network device to a target access network device, UE capability information obtained by the target access network device from the source access network device may not be complete UE capability information.

In the embodiments of this application, complete UE capability information is a term from a perspective of the target access network device. The complete UE capability information may be replaced and described as UE capability information matching the target access network device, or UE capability information that matches the target access network device, or UE capability information required by the target access network device, or may be replaced with target capability information described in the embodiments of this application. The complete UE capability information may include all UE capability information of a lower UE capability in a UE capability of the UE and a UE capability supported by the target access network device. For example, assuming that the UE capability of the UE is LTE R15 and that the UE capability supported by the target access network device is LTE R16, the complete UE capability information may include all UE capability information corresponding to LTE R15.

To resolve the foregoing technical problem, the embodiments of this application provide a UE capability reporting method. The method may include: UE obtains first information used to indicate a UE capability supported by a target access network device; and the UE reports second information based on a UE capability of the UE and the UE capability supported by the target access network device, where the second information includes information, other than UE capability information stored in a source access network device, in target capability information, and the target capability information is UE capability information of a lower UE capability in the UE capability of the UE and the UE capability supported by the target access network device. In this way, when the UE performs cell handover, the UE reports, to the target access network device, capability information other than the UE capability information stored in the source access network device, in UE capability information matching the target access network device. This not only ensures integrity of the UE capability information obtained by the target access network device, but also reduces a reporting amount of the UE, reduces power consumption of the UE, saves transmission resources, and increases a reporting rate of the UE capability information.

It should be understood that a precondition for triggering execution of the UE capability reporting method provided in the embodiment of this application is: the UE capability supported by the target access network device is higher than the UE capability of the UE and the UE capability of the UE is higher than a UE capability supported by the source access network device.

Under this condition, the UE capability information matching the target access network device includes UE capability information corresponding to the UE capability of the UE, and UE capability information matching the source access network device includes UE capability information corresponding to the UE capability supported by the source access network device, that is, the UE capability information corresponding to the UE capability supported by the source access network device is stored in a context of the UE in the source access network device. In this case, during the cell handover of the UE, the target access network device may obtain, from the source access network device, the UE capability information corresponding to the UE capability supported by the source access network device. The other UE capability information than the UE capability information stored in the source access network device, in the UE capability information corresponding to the UE capability of the UE, may be reported by the UE to the target access network device by using the method described in the embodiments of this application, that is, a part of the UE capability information matching the target access network device may be obtained by the target access network device from the source access network device, and the remaining UE capability information may be reported by the UE.

For example, assuming that a protocol release of the UE is R17 and that a protocol release of the source access network device currently serving the UE is R16, to reduce air interface overheads for UE capability reporting, the UE reports UE capability information of R16 to the source access network device. During the cell handover, when the UE is handed over from the source access device to the target access network device, assuming that a protocol release of the target access network device is R18, the target access network device obtains the UE capability information of R16 from the source access network device, UE capability information related to R17 is missing, and complete UE capability information cannot be obtained. In view of this, based on the UE capability or protocol release supported by the target access network device and the UE capability or protocol release of the UE, the UE can use the method provided in the embodiments of this application to determine that the UE capability information to be reported is the missing UE capability information related to R17, and report the missing UE capability information to the target access network device.

The following describes the technical solutions in the embodiments of this application with reference to the accompanying drawings in the embodiments of this application.

The UE capability reporting method provided in the embodiments of this application may be applied to a communications system shown in FIG. 1. The communications system may be a cellular communications system, or may be a universal mobile telecommunications system terrestrial radio access network (universal mobile telecommunications system terrestrial radio access network. UTRAN) system, an evolved UMTS terrestrial radio access network (E-UTRAN) system, a long term evolution (long term evolution, LTE) system, or the like, or may be a 5th generation (5th generation, 5G) mobile communications system or a new radio (new radio, NG) system, or may be other mobile communications systems, such as 4G and 5G interworking systems, which is not limited.

The UE capability reporting method provided in the embodiments of this application may be applied to various communication scenarios, for example, may be applied to one or more of the following communication scenarios: enhanced mobile broadband (enhanced mobile broadband, eMBB), ultra-reliable and low latency communication (ultra-reliable low-latency communication, URLLC), machine type communication (machine type communication, MTC), massive machine type communication (massive machine type communications, mMTC), device-to-device (device-to-device, D2D), vehicle to everything (vehicle to everything, V2X), vehicle to vehicle (vehicle to vehicle, V2V), Internet of Things (internet of things, IoT), and the like.

As shown in FIG. 1, the communications system may include a source access network device, a target access network device, and UE. The UE can communicate with the source access network device through a Uu interface. The UE can move from a coverage area (for example, a cell) of the source access network device to a coverage area (for example, a cell) of the target access network device and communicate with the target access network device through the Uu interface. The source access network device and the target access network device can communicate with each other through an Xn interface or an X2 interface.

In the embodiments of this application, the source access network device may be an access network device connected to the UE before the UE performs the cell handover, the source access network device may be referred to as the access network device currently serving the UE, and the target access network device may be an access network device connected to the UE after the UE performs the cell handover. The UE capability supported by the source access network device, the UE capability supported by the target access network device, and the UE capability of the UE may be the same or different. The protocol release of the source access network device, the protocol release of the target access network device, and the protocol release of the UE may be the same or different. For example, the protocol release of the source access network device may be R16, the protocol release of the target access network device may be R17, and the protocol release of the UE may be R15; or the protocol release of the source access network device, the protocol release of the target access device, and the protocol release of the UE are all R15.

The following describes network elements in the system shown in FIG. 1.

The UE in FIG. 1 may be referred to as terminal equipment (terminal equipment), user equipment (user equipment, UE), a mobile station (mobile station, MS), a mobile terminal (mobile terminal, MT), or the like. The UE may be deployed on a water surface (for example, a ship), or may be deployed in the air (such as an airplane, a balloon, and a satellite). Specifically, the terminal in FIG. 1 may be a mobile phone (mobile phone), a tablet computer, or a computer with a wireless transceiver function. Alternatively, the terminal may be a virtual reality (virtual reality, VR) terminal, an augmented reality (augmented reality, AR) terminal, a wireless terminal in industrial control, a wireless terminal in unmanned driving, a wireless terminal in telemedicine, a wireless terminal in a smart grid, a wireless terminal in a smart city (smart city), a wireless terminal in a smart home (smart home), or the like.

The source access network device and the target access network device in FIG. 1 are mainly configured to implement functions such as a wireless physical control function, resource scheduling, radio resource management, radio access control, mobility management, and terminal capability information enquiry. Specifically, the source access network device and the target access network device may be access network (access network, AN) or radio access network (radio access network, RAN) devices, or may be devices formed by a plurality of 5G-AN/5G-RAN nodes, or may be any of access network devices (nodeB, NB), evolved access network devices (evolution nodeB, eNB), next-generation access network devices (generation nodeB, gNB), transmission and reception points (transmission receive point, TRP), transmission points (transmission point, TP), and other access nodes.

It should be understood that FIG. 1 is only an exemplary architectural diagram. A quantity of network elements included in the communications system shown in FIG. 1 is not limited. In addition to the network elements shown in FIG. 1, the communications system shown in FIG. 1 may further include other nodes, such as a core network device and an application server.

Figure 2:
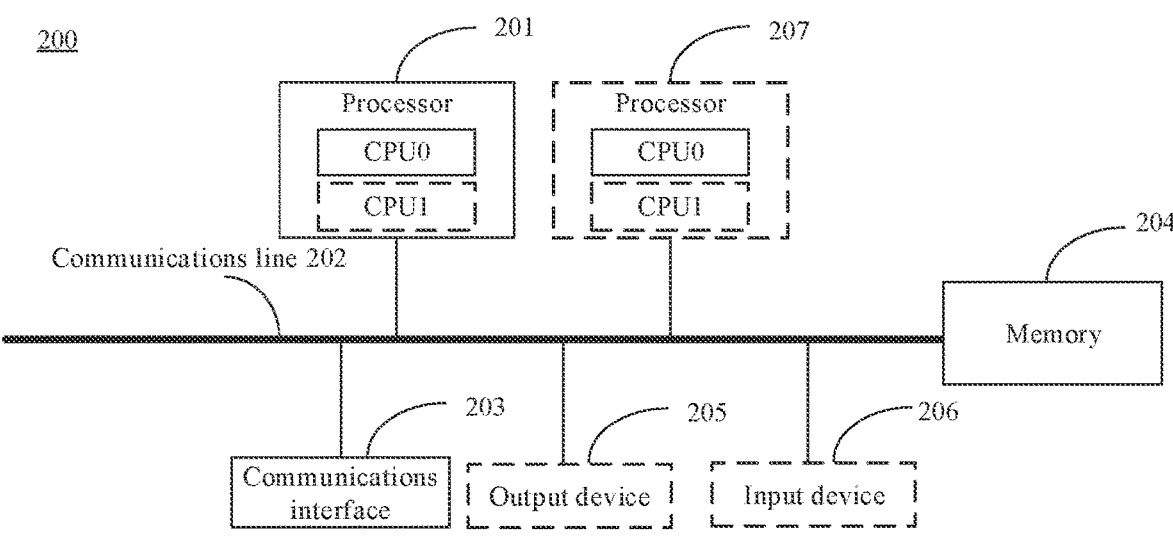
FIG. 2 is a schematic diagram of composition of a communications apparatus according to an embodiment of this application.

In a specific implementation, each network element shown in FIG. 1, such as the UE, the source access network device, and the target access network device, may have components shown in FIG. 2. FIG. 2 is a schematic diagram of composition of a communications apparatus 200 according to an embodiment of this application. As shown in FIG. 2, the communications apparatus 200 includes at least one processor 201, a communications line 202, and at least one communications interface 203. Further, the communications apparatus 200 may further include a memory 204. The processor 201, the memory 204, and the communications interface 203 may be connected to each other by using the communications line 202. In this embodiment of this application, at least one may be one, two, three, or more. This is not limited in this embodiment of this application.

The following describes each component included in the communications apparatus 200 shown in FIG. 2.

The processor 201 may be a central processing unit (central processing unit, CPU), a general-purpose processor, a network processor (network processor, NP), a digital signal processor (digital signal processing, DSP), a microprocessor, a microcontroller, a programmable logic device (programmable logic device, PLD), or any combination thereof. Alternatively, the processor may be any other apparatus having a processing function, such as a circuit, a device, or a software module.

The communication line 202 may include a path for transmitting information between the components included in the communications apparatus.

The communications interface 203 may be configured to communicate with another device or communications network (for example, an Ethernet, a radio access network (radio access network, RAN), or a wireless local area network (wireless local area networks, WLAN)). The communications interface 203 may be a module, a circuit, a transceiver, or any apparatus capable of implementing communication.

The memory 204 may be a read-only memory (read-only memory, ROM) or another type of static storage device that can store static information and/or instructions, or may be a random access memory (random access memory, RAM) or another type of dynamic storage device that can store information and/or instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store desired program code in a form of an instruction or a data structure and can be accessed by a computer, which is not limited.

In a possible design, the memory 204 may exist independently of the processor 201, that is, the memory 204 may be an external memory of the processor 201. In this case, the memory 204 may be connected to the processor 201 by using the communications line 202 and configured to store an instruction or program code. When the processor 201 invokes and executes the instruction or program code stored in the memory 204, a UE capability reporting method provided in the following embodiment of this application can be implemented. In another possible design, the memory 204 may alternatively be integrated with the processor 201, that is, the memory 204 may be an internal memory of the processor 201. For example, the memory 204 is a cache and may be configured to temporarily store some data and/or instruction information.

In a possible implementation, the processor 201 may include one or more CPUs, such as a CPU 0 and a CPU 1 in FIG. 2. In another possible implementation, the communications apparatus 200 may include a plurality of processors, such as the processor 201 and a processor 207 in FIG. 2. In still another possible implementation, the communications apparatus 200 may further include an output device 205 and an input device 206. For example, the input device 206 may be a device such as a keyboard, a mouse, a microphone, or a joystick, and the output device 205 may be a device such as a display or a speaker (speaker).

It should be noted that the communications apparatus 200 may be a general-purpose device or a dedicated device. For example, the communications apparatus 200 may be a desktop computer, a portable computer, a network server, a PDA, a mobile phone, a tablet computer, a wireless terminal, an embedded device, a chip system, or a device with a similar structure in FIG. 2. A type of the communications apparatus 200 is not limited in this embodiment of this application. In this embodiment of this application, the chip system may include a chip or may include a chip and another discrete component.

With reference to the system shown in FIG. 1, the following describes a UE capability reporting method provided in an embodiment of this application. Each device mentioned in the following method embodiments may have the components shown in FIG. 2. Details are not described again.

Figures 3, 4A:
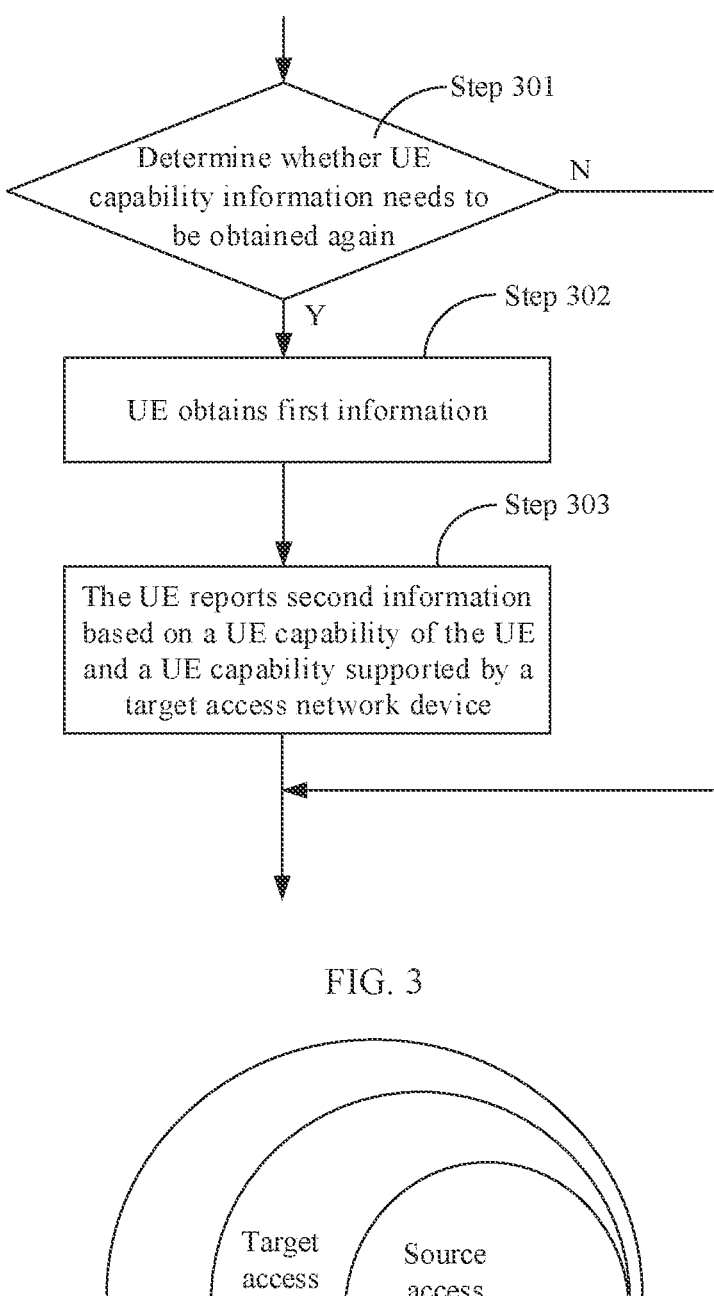
FIG. 3 is a flowchart of a UE capability reporting method according to an embodiment of this application.
FIG. 4*a* to FIG. 4*f* are schematic diagrams of UE capability relationships corresponding to various network elements according to an embodiment of this application.

FIG. 3 is a UE capability reporting method provided in an embodiment of this application. The method is applied to a scenario in which UE is handed over from a source access network device to a target access network device. As shown in FIG. 3, the method may include the following steps.

Step 301: Determine whether UE capability information needs to be obtained again. If the UE capability information needs to be obtained again, steps 302 and 303 are performed; otherwise, if the UE capability information does not need to be obtained again, an existing procedure is performed.

For the related description of the UE capability information, refer to the foregoing description. Details are not described again.

Step 301 may be performed by UE, a source access device, or a target access network device, which is not limited. The UE may be the UE in FIG. 1. The source access network device may be the source access network device in FIG. 1. The source access network device establishes a connection to the UE, and the source access network device currently serves the UE. In the connection establishment process, the source access network device and the UE can learn UE capabilities of each other. The source access network device can store UE capability information matching the source access network device. The target access network device is an access network device to which the UE is to be handed over.

Step 301 may be understood as: in a scenario in which the UE is handed over from the source access network device to the target access network device, determining whether a network-side device (such as the target access network device) further needs to obtain other UE capability information for the UE, in addition to UE capability information stored in the source access network device for the UE. Alternatively, step 301 may be understood as: in a scenario in which the UE is handed over from the source access network device to the target access network device, assuming that an existing handover procedure is used, determining whether UE capability information obtained by the target access network device from the source access network device is complete.

For example, the UE capability information stored in the source access network device is UE capability information corresponding to R16, and UE capability information matching the target access network device is UE capability information corresponding to R17. In this case, in addition to the UE capability information corresponding to R16, other UE capability information than the UE capability information corresponding to R16 in the UE capability information corresponding to R17 needs to be obtained again. For another example, assuming that the UE capability information stored in the source access network device is the same as the UE capability information matching the target access network device, the UE capability information does not need to be obtained again.

In this application, the UE capability information matching the target access network device may be referred to as target capability information, UE capability information that matches the target access network device, or complete UE capability information. The UE capability information matching the target access network device may be determined based on UE capability information of a lower UE capability in the UE capability of the UE and a UE capability supported by the target access network device. When the UE capability of the UE is higher than or equal to the UE capability supported by the target access network device, the UE capability information matching the target access network device may include the UE capability information of the UE capability supported by the target access network device. When the UE capability of the UE is lower than the UE capability supported by the target access network device, the UE capability information matching the target access network device may include the UE capability information corresponding to the UE capability of the UE. For example, assuming that a protocol release of the UE is R16 and that a protocol release of the target access network device is R17, the UE capability information matching the target access network device is the UE capability information corresponding to R16. For another example, assuming that a protocol release of the UE is R17 and that a protocol release of the target access network device is R16, the UE capability information matching the target access network device is the UE capability information corresponding to the protocol release R16 of the target access network device.

For example, whether the UE capability information needs to be obtained again may be determined based on the UE capability of the UE, the UE capability supported by the source access network device, and the UE capability supported by the target access network device. For example, the UE capability of the UE, the UE capability supported by the source access network device, and the UE capability supported by the target access network device are compared, and whether the UE capability information needs to be obtained again is determined based on levels of the three UE capabilities.

Assuming that a size of a circle represents a UE capability of a device or a UE capability supported by a device, the larger the circle is, the higher the UE capability of the device or the UE capability supported by the device is. The following cases 1 to 6 are described with reference to FIG. 4a to FIG. 4f. In the case 1 or the case 2, the UE capability of the UE is higher than the UE capability supported by the source access network device, the UE capability supported by the target access network device is higher than the UE capability supported by the source access network device, and it is determined that the UE capability information needs to be obtained again. In any one of the cases 3 to 6, it is determined that the UE capability information does not need to be obtained again.

Case 1: UE capability of the UE>UE capability of the target access network device>UE capability supported by the source access network device.

As shown in FIG. 4a, when UE capability of the UE>UE capability of the target access network device>UE capability supported by the source access network device, the UE capability information stored in the source access network device may be the UE capability information corresponding to the UE capability supported by the source access network device, and the UE capability information matching the target access network device is the UE capability information corresponding to the UE capability supported by the target access network device. Because the UE capability supported by the target access network device is higher than the UE capability supported by the source access network device, the UE capability information stored in the source access network device is included in the UE capability information matching the target access device. The UE capability information obtained by the target access network device from the source access network device is incomplete, and the missing UE capability information needs to be obtained again.

For example, assuming that the protocol release of the UE is R17, and that the protocol release of the target access network device is R16, and that a protocol release of the source access network device is R15, it is determined that other UE capability information than UE capability information of R15 in the UE capability information of R16 needs to be obtained.

Case 2: UE capability of the target access network device>UE capability of the UE>UE capability supported by the source access network device.

Figures 4B, 4C:
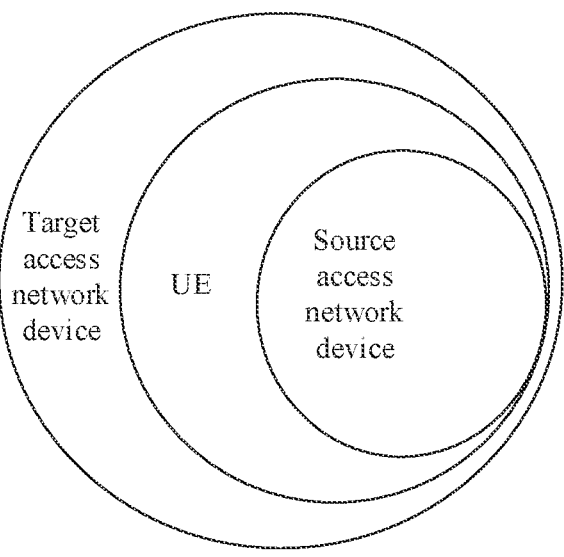

As shown in FIG. 4b, when UE capability of the target access network device>UE capability of the UE>UE capability supported by the source access network device, the UE capability information stored in the source access network device may be the UE capability information corresponding to the UE capability supported by the source access network device, and the UE capability information matching the target access network device is the UE capability information corresponding to the UE capability of the UE. Because the UE capability of the UE is higher than the UE capability supported by the source access network device, the UE capability information stored in the source access network device is included in the UE capability information matching the target access device. The UE capability information obtained by the target access network device from the source access network device is incomplete, and the missing UE capability information needs to be obtained again.

For example, assuming that the protocol release of the UE is R16, and that the protocol release of the target access network device is R17, and that a protocol release of the source access network device is R15, it is determined that other UE capability information than UE capability information of R15 in the UE capability information of R16 needs to be obtained.

Case 3: UE capability of the UE>UE capability supported by the source access network device>UE capability of the target access network device.

As shown in FIG. 4c, when UE capability of the UE>UE capability supported by the source access network device>UE capability of the target access network device, the UE capability information stored in the source access network device may be the UE capability information corresponding to the UE capability supported by the source access network device, and the UE capability information matching the target access network device is the UE capability information corresponding to the UE capability supported by the target access network device. Because the UE capability supported by the target access network device is lower than the UE capability supported by the source access network device, the UE capability information stored in the source access network device is compatible with the UE capability information matching the target access device. The UE capability information obtained by the target access network device from the source access network device is complete, and the UE capability information does not need to be obtained again.

For example, assuming that the protocol release of the UE is R17, and that the protocol release of the source access network device is R16, and that the protocol release of the target access network device is R15, the target access network device can obtain the UE capability information of R16 from the source access network device. Because R16 is compatible with R15, the target access network device obtains the complete UE capability information from the source access network device and does not need to obtain the UE capability information again.

Case 4: UE capability of the target access network device>UE capability supported by the source access network device>UE capability of the UE.

Figure 4D:
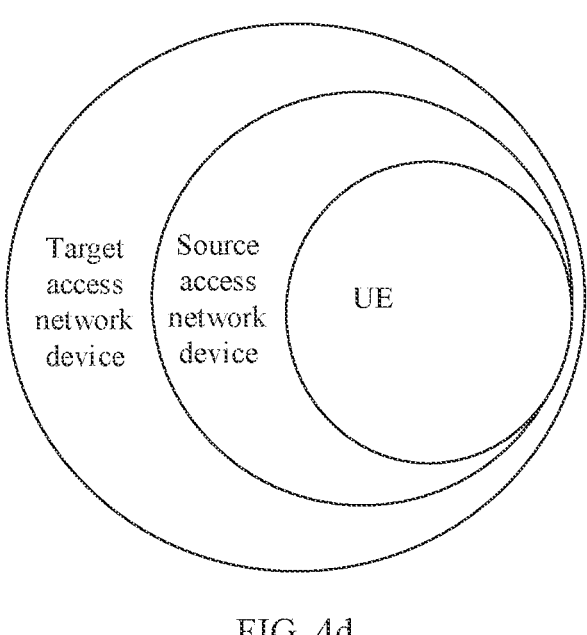

As shown in FIG. 4d, when UE capability of the target access network device>UE capability supported by the source access network device>UE capability of the UE, the UE capability information stored in the source access network device may be the UE capability information corresponding to the UE capability of the UE, the UE capability information matching the target access network device is the UE capability information corresponding to the UE capability of the UE, and the UE capability information stored in the source access network device is the same as the UE capability information matching the target access device. The target access network device can obtain the complete UE capability information from the source access network device and does not need to obtain the UE capability information again.

For example, assuming that the protocol release of the target access network device is R17, and that the protocol release of the source access network device is R16, and that the protocol release of the UE is R15, the target access network device obtains the complete UE capability information (that is, the UE capability information of R15) from the source access network device and does not need to obtain the UE capability information again.

Case 5: UE capability supported by the source access network device>UE capability of the UE>UE capability of the target access network device.

Figure 4E:
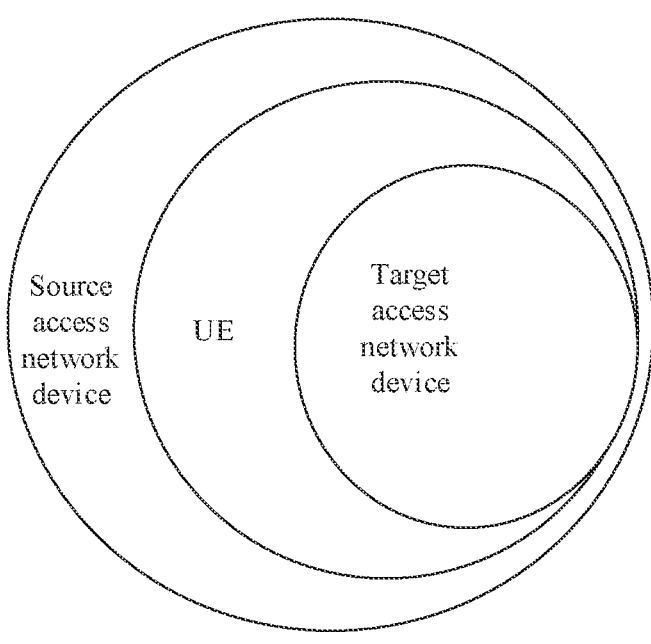

As shown in FIG. 4e, when UE capability supported by the source access network device>UE capability of the UE>UE capability of the target access network device, the UE capability information stored in the source access network device may be the UE capability information corresponding to the UE capability of the UE, and the UE capability information matching the target access network device is the UE capability information corresponding to the UE capability supported by the target access network device. Because the UE capability of the UE is higher than the UE capability of the target access network device, the UE capability information stored in the source access network device may be compatible with the UE capability information of the target access device. In this case, the target access network device obtains the complete UE capability information from the source access network device and does not need to obtain the UE capability information again.

For example, assuming that the protocol release of the source access network device is R17, and that the protocol release of the UE is R16, and that the protocol release of the target access network device is R15, the target access network device obtains the UE capability information of R16 from the source access network device. Because the UE capability information of R16 is compatible with the UE capability information of R15 and is complete UE capability information, the UE capability information does not need to be obtained again.

Case 6: UE capability supported by the source access network device>UE capability of the target access network device>UE capability of the UE.

Figure 4F:
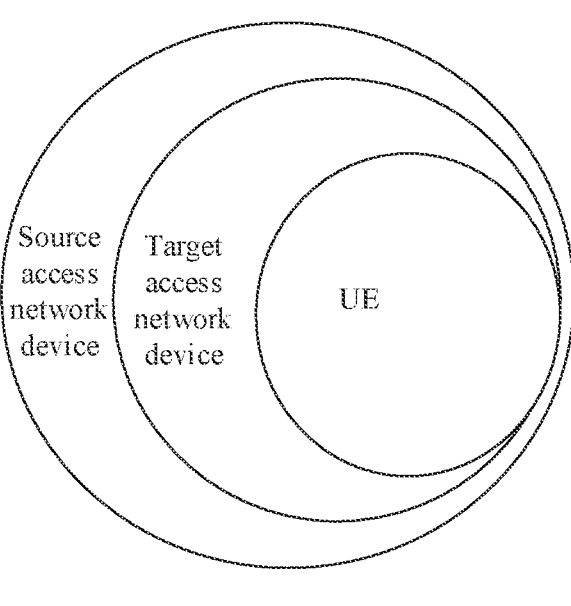

As shown in FIG. 4f, when UE capability supported by the source access network device>UE capability of the target access network device>UE capability of the UE, the UE capability information stored in the source access network device may be the UE capability information corresponding to the UE capability of the UE, and the UE capability information matching the target access network device is the UE capability information corresponding to the UE capability supported by the target access network device. Because the UE capability of the UE is higher than the UE capability of the target access network device, the UE capability information stored in the source access network device may be compatible with the UE capability information of the target access device. In this case, the target access network device obtains the complete UE capability information from the source access network device and does not need to obtain the UE capability information again.

For example, assuming that the protocol release of the source access network device is R17, and that the protocol release of the target access network device is R16, and that the protocol release of the UE is R15, the target access network device obtains the UE capability information of R15 from the source access network device information. Because the UE capability information of R15 is the complete UE capability information, the UE capability information does not need to be obtained again.

As can be learned from above, in the foregoing cases 3 to 6, for the target access network device, the UE capability information stored in the source access network device includes the complete UE capability information, and the target access network device can obtain the complete UE capability information from the source access network device and does not need to obtain the UE capability information from the UE again. Only signaling interaction between the target access network device and the source access network device is needed to ensure that the target access network device obtains the complete UE capability information. A process of obtaining the complete UE capability information by the target access network device from the source access network device is as follows:

In a possible design, the source access network device may send all the UE capability information stored in the source access network device to the target network device, to ensure integrity of the UE capability information obtained by the target access network device. The UE capability information may be carried in a handover request and sent.

In another possible design, the source access network device may add the UE capability information matching the target access network device, in the UE capability information stored in the source access network device, to a handover request and send the handover request to the target access network device, that is, a part of the UE capability information stored in the source access network device may be sent to the target access network device. This not only ensures that the target access network device obtains the complete UE capability information, but also reduces an amount of the UE capability information carried in the handover request, reduces signaling overheads between the source access network device and the target access network device, and improves transmission efficiency of the UE capability information between the access network devices.

For example, assuming that the source access network device stores the UE capability information of R16 and that the UE capability information matching the target access network device is the UE capability information of R15, the source access network device may send all the UE capability information stored in the source access network device to the target access network device or send the UE capability information related to R15 in the UE capability information stored in the source access network device to the target access network device. The UE capability information may be carried in the handover request and sent.

Step 302: The UE obtains first information.

The first information may be used to indicate the UE capability supported by the target access network device. The first information may include but is not limited to a protocol release number of the target access network device or other information that can indicate the UE capability supported by the target access network device.

In an example, the UE may obtain the first information from the source access network device in a process of handover of the UE from the source access network device to the target access network device. For example, as described in the following embodiment corresponding to FIG. 5, the UE may receive an RRC connection reconfiguration from the source access network device, where the RRC connection reconfiguration carries the first information.

In another example, the UE may receive the first information in a UE capability enquiry procedure.

For example, as described in the following embodiment corresponding to FIG. 6, the UE may receive, from the target access network device, a UE capability enquiry request carrying the first information; or as described in the following embodiment corresponding to FIG. 7, the UE may receive, from the source access network device, a UE capability enquiry request carrying the first information.

It should be understood that this application is not limited to an execution order of step 301 and step 302. When step 301 is performed by the UE, step 302 may be performed first, and then step 301 may be performed. When step 301 is performed by the source access network device or the target access network device, as shown in FIG. 3, step 301 may be performed first, and then step 302 may be performed. While step 302 is performed, the UE may receive third information, where the third information is used to instruct the UE to report the UE capability information such as second information again.

The third information and the first information may be carried in a same signaling message, such as the RRC connection reconfiguration, or carried in different signaling messages, which is not limited.

Step 303: The UE reports the second information based on the UE capability of the UE and the UE capability supported by the target access network device.

Step 303 may be: the UE determines the second information based on the UE capability of the UE, the UE capability supported by the target access network device, and the UE capability supported by the source access network device and reports the second information.

The second information may include the capability information, other than the UE capability information stored in the source access network device, in the target capability information, and the target capability information is the UE capability information of the lower UE capability in the UE capability of the UE and the UE capability supported by the target access network device. For the related description of the target capability information, refer to the description in step 301. Details are not described again.

In this embodiment of this application, that the UE determines the second information based on the UE capability of the UE, the UE capability supported by the target access network device, and the UE capability supported by the source access network device may include: the UE matches the UE capability information of the source access network device based on the UE capability of the UE and the UE capability supported by the source access network device, and the UE determines the target capability information based on the UE capability of the UE and the UE capability supported by the target access network device and uses other information than the UE capability information already reported by the UE to the source access network device, in the target capability information, as the second information.

Alternatively, the UE may determine the second information based on the UE capability of the UE, the UE capability supported by the target access network device, and the UE capability information stored in the source access network device. The UE capability information stored in the source access network device is the UE capability information reported by the UE to the source access network device and matching the source access network device, and the UE may store the UE capability information. For example, the UE may determine the target capability information based on the UE capability of the UE and the UE capability supported by the target access network device, obtain, locally from the UE, the UE capability information stored in the UE, and use other information than the UE capability information stored in the UE and already reported by the UE to the source access network device, in the target capability information, as the second information.

For example, if the source access network device stores the UE capability information of R15 and the target capability information is the UE capability information of R16, the second information includes other capability information than UE capability information compatible with R15, in the UE capability information of R16.

That the UE reports the second information may include that the UE directly reports the second information to the target access network device, or indirectly sends the second information to the target access network device, for example, through the source access network device to the target access network device.

In an example, the UE may directly report the second information to the target access network device in the process of handover of the UE from the source access network device to the target access network device. For example, as described in the following embodiment corresponding to FIG. 5, the UE sends an RRC connection reconfiguration complete to the target access network device, where the RRC connection reconfiguration complete carries the second information.

In another example, the UE may report the second information to the target access network device in the UE capability enquiry process.

For example, as described in the following embodiment corresponding to FIG. 6, the UE may send a UE capability enquiry response to the target access network device, where the UE capability enquiry response may carry the second information.

In still another example, the UE may report the second information to the target access network device through the source access network device in the UE capability enquiry process and during cell handover of the UE from the source access network device to the target access network device.

For example, as described in the following embodiment corresponding to FIG. 7, the UE may send a UE capability enquiry response carrying the second information to the source access network device in the UE capability enquiry process, so that the source access network device receives the second information, adds the second information and the UE capability information stored in the source access network device to the handover request, and sends the handover request to the target access network device during cell handover of the UE.

Based on the method shown in FIG. 3, the UE can report the capability information other than the UE capability information stored in the source access network device to the target access network device, to ensure integrity of the UE capability information. In addition, in comparison with an existing requirement for reporting complete UE capability information matching a target access network device, the amount of the capability information reported by the UE is smaller. Therefore, power consumption of the UE can be reduced, transmission resources can be reduced, and a reporting rate of the UE capability information can be increased.

For example, using handover of UE from a base station of an earlier protocol release to a base station of a later protocol release as an example, assuming that a protocol release of the UE is R17 and that a protocol release of a current serving source base station is R16, to reduce air interface overheads for UE capability reporting, in a process of establishing a connection and communication between the UE and the source base station, the UE reports only UE capability information of R16 to the source base station, that is, only the UE capability information of R16 is stored in the source base station. When the UE is handed over to a target base station whose protocol release is R18, the UE needs to report the UE capability information again and needs to report only UE capability information that is different in R17 compared with R16, such as a new frequency band and a carrier aggregation capability in R17 compared with R16. This can not only ensure integrity of the UE capability information obtained by the target base station, but also reduce a reporting amount of the UE capability information and the number of reporting times, reduce power consumption of the UE, and increase a reporting rate of the UE capability information.

Figure 5:
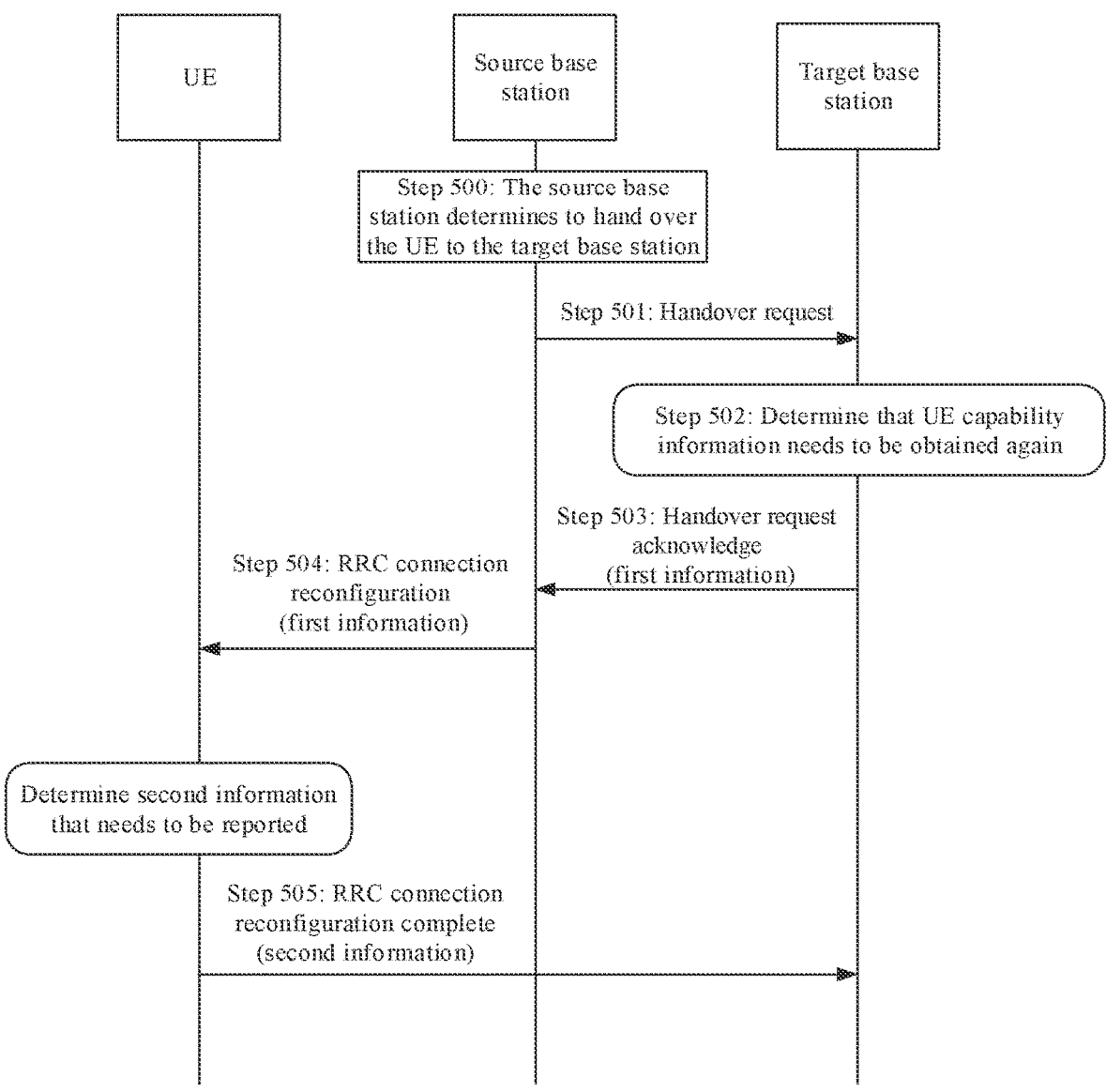
FIG. 5 is a flowchart of another UE capability reporting method according to an embodiment of this application.

With reference to FIG. 5, assuming that an access network device is a base station, the following describes a process of reporting second information during cell handover in which UE is handed over from a source access network device to a target access network device. It should be understood that, in the method shown in FIG. 5, a base station that serves the UE is a source base station. Before the method shown in FIG. 5 is performed, the UE establishes a connection to the source base station, and the UE reports, to the source base station, UE capability information matching the source base station, and the source base station stores the UE capability information. For example, the UE and the source base station can exchange their UE capabilities. The UE can determine, based on the UE capability of the UE and the UE capability supported by the source base station, the UE capability information matching the source base station, and report, to the source base station, the UE capability information matching the source base station. The source base station receives the UE capability information reported by the UE and stores the received UE capability information in a UE context corresponding to the UE.

FIG. 5 is another UE capability reporting method according to an embodiment of this application. As shown in FIG. 5, the method may include the following steps.

Step 500: A source base station determines to hand over UE to a target base station.

For example, the source base station may receive a measurement report (measurement report) from the UE, and determine, based on the measurement report, to hand over the UE to the target base station.

The measurement report may include signal quality measurement values of one or more cells that are obtained by the terminal through measurement and cell identities of the one or more cells. The one or more cells may include a cell that the UE currently camps on and a neighboring cell of the cell that the UE currently camps on. Signal quality may include any one or more of reference signal received power (reference signal receiving power, RSRP), reference signal received quality (reference signal receiving quality, RSRQ), and a signal to interference plus noise ratio (signal to interference plus noise, SINR).

That the source base station determines, based on the measurement report, to hand over the UE to the target base station may include: the source base station selects, based on the measurement report, a base station corresponding to a cell with a highest signal quality measurement value from the signal quality measurement values of the one or more cells as the target base station.

Step 501: The source base station sends a handover request (handover request) to the target base station. Correspondingly, the target base station receives the handover request.

The handover request may be used to request to hand over the UE to the target base station. The handover request may carry UE capability information stored in the source base station, indication information (such as a protocol release number of the source base station) used to indicate a UE capability supported by the source base station, and indication information (such as a protocol release number of the UE) used to indicate a UE capability of the UE. The handover request may further carry other information, such as a service requirement of the UE.

It should be noted that, if the UE capability supported by the source base station is lower than the UE capability of the UE, the handover request may carry the indication information used to indicate the UE capability of the UE. Conversely, if the UE capability supported by the source base station is higher than or equal to the UE capability of the UE, the handover request may not carry the indication information used to indicate the UE capability of the UE, to reduce signaling overheads. In this case, if the target base station learns that the handover request carries the indication information used to indicate the UE capability supported by the source base station but does not carry the indication information used to indicate the UE capability of the UE, the target base station may consider by default that the UE capability supported by the source base station is higher than or equal to the UE capability of the UE, and determine that UE capability information carried in the handover request is UE capability information of the UE capability of the UE.

Specifically, the UE capability information carried in the handover request may be reported by the UE to the source base station when the UE establishes a connection to the source base station, and the source base station stores the UE capability information in a UE context of the UE. The UE capability information may be referred to as UE capability information matching the source base station. The UE capability information stored in the source base station may be determined based on the UE capability of the UE and the UE capability supported by the source base station. When the UE capability of the UE is higher than the UE capability supported by the source base station, the UE capability information stored in the source base station may be UE capability information of the UE capability supported by the source base station. When the UE capability of the UE is lower than or equal to the UE capability supported by the source base station, the UE capability information stored in the source base station may be the UE capability information of the UE capability of the UE.

For example, assuming that a protocol release of the UE is R15 and that a protocol release of the source base station is R16, the source base station stores UE capability information of R15. For another example, assuming that a protocol release of the UE is R15 and that a protocol release of the source base station is R14, the source base station stores UE capability information of R14.

Step 502: The target base station determines, based on a UE capability supported by the target base station, the UE capability supported by the source base station, and the UE capability of the UE, whether the UE capability information needs to be obtained again.

If the target base station determines that the UE capability information needs to be obtained again, step 503 to step 505 are performed.

Conversely, if the target base station determines that the UE capability information does not need to be obtained again, an existing procedure is performed. It should be understood that, if the handover request received by the target base station does not carry the UE capability information stored in the source base station, and the target base station determines in step 502 that the UE capability information does not need to be obtained again, the source base station may add the UE capability information stored in the source base station to another signaling message and send the signaling message to the target base station, or the source base station adds UE capability information matching the target base station, in the UE capability information stored in the source base station, to another signaling message and sends the signaling message to the target base station.

For the process of determining whether the target base station needs to obtain the UE capability information again, refer to step 301. Details are not described again.

Step 503: The target base station sends a handover request acknowledge (handover request acknowledge) to the source base station. Correspondingly, the source base station receives the handover request acknowledge.

The handover request acknowledge corresponds to the handover request, and the handover request acknowledge may be used to instruct to hand over the UE to the target base station. The handover request acknowledge may carry first information, and the first information may be used to indicate the UE capability supported by the target base station.

For example, the first information may include the protocol release number or a protocol release index number of the target base station.

Further optionally, the handover request acknowledge further carries third information, where the third information is used to instruct the UE to report the second information. Alternatively, in other words, the third information is used to indicate that the UE capability information needs to be obtained again.

Step 504: The source base station sends an RRC connection reconfiguration to the UE. Correspondingly, the UE receives the RRC connection reconfiguration.

The RRC connection reconfiguration may be used to instruct the UE to establish an RRC connection to the target base station. The first information may be carried in the RRC connection reconfiguration (RRC connection reconfiguration).

Further optionally, in a case that the handover request acknowledge described in step 503 carries the third information, the RRC connection reconfiguration further carries the third information.

Step 505: The UE sends, based on the UE capability of the UE and the UE capability supported by the target base station, an RRC connection reconfiguration complete (RRC connection reconfiguration complete) carrying the second information to the target base station. Correspondingly, the target base station receives the RRC connection reconfiguration complete carrying the second information.

The RRC connection reconfiguration complete may be used to indicate that the UE completes an RRC configuration with the target base station.

The related description of the second information is described in step 303. Details are not described again.

Step 505 may alternatively be described as follows: The UE obtains the first information from the RRC connection reconfiguration, determines the second information based on the UE capability of the UE, the UE capability supported by the target base station as indicated by the first information, and the UE capability of the source base station, and sends the RRC connection reconfiguration complete carrying the second information to the target base station.

For example, that the UE determines the second information based on the UE capability of the UE, the UE capability supported by the target base station, and the UE capability supported by the source base station may include: the UE determines, based on the UE capability of the UE and the UE capability supported by the source base station, UE capability information already reported by the UE to the source base station, that is, the UE capability information stored in the source base station, before the method shown in FIG. 5 is performed; and the UE determines target capability information based on the UE capability of the UE and the UE capability supported by the target base station and uses other information than the UE capability information already reported by the UE to the source base station, in the target capability information, as the second information.

Alternatively, the UE may further determine the second information based on the UE capability of the UE, the UE capability supported by the target base station, and the UE capability information stored in the UE and reported by the UE to the source base station. For example, the UE may determine target capability information based on the UE capability of the UE and the UE capability supported by the target base station and use other information than UE capability information stored in the UE and already reported by the UE to the source base station, in the target capability information, as the second information. Before the method shown in FIG. 5 is performed, the UE may store, in the UE, the UE capability information reported by the UE to the source base station.

It should be understood that step 505 is performed conditionally. The conditions may include: 1. After the UE receives the RRC connection reconfiguration, as long as the UE obtains the first information from the RRC connection reconfiguration, the UE needs to report the second information by default and perform step 505. 2. After the UE receives the RRC connection reconfiguration, in addition to obtaining the first information from the RRC connection reconfiguration, if the UE also obtains the third information from the RRC connection reconfiguration, the UE determines, based on the third information, that the second information needs to be reported again, and performs step 505.

Further, after receiving the RRC connection reconfiguration complete, the target base station obtains the second information from the RRC connection reconfiguration complete, combines the second information and the UE capability information obtained by the target base station from the source base station into complete UE capability information, and stores the complete UE capability information in a UE context in the target base station.

FIG. 5 depicts a process of obtaining the UE capability information again based on cell handover of the UE. In the method shown in FIG. 5, after the target base station determines, based on the UE capability of the UE, the UE capability supported by the source base station, and the UE capability supported by the target base station, that the UE capability information needs to be obtained again, the UE determines, based on the UE capability supported by the target base station and the UE capability of the UE, different UE capability information in the target capability information compared with the UE capability information stored in the source base station, and reports, in an RRC reconfiguration procedure, the second information used to indicate the different UE capability information. Therefore, integrity of the UE capability information is ensured. In addition, an amount of capability information reported by the UE is smaller. Therefore, power consumption of the UE is reduced, transmission resources are saved, and a reporting rate of the UE capability information is increased.

Figure 6:
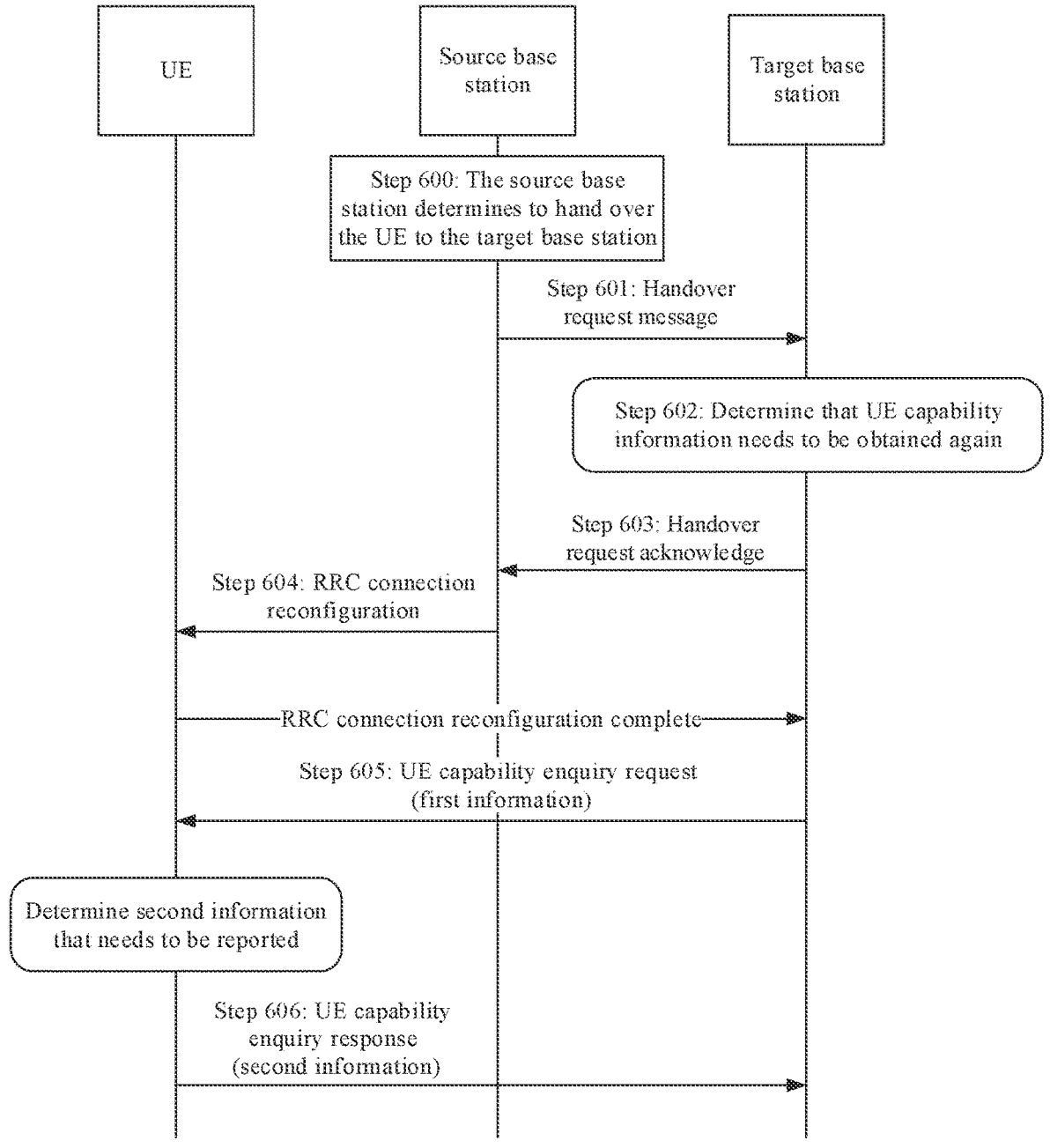
FIG. 6 is a flowchart of another UE capability reporting method according to an embodiment of this application.

With reference to FIG. 6, assuming that an access network device is a base station, the following describes reporting of second information in a UE capability enquiry process in the method shown in FIG. 3. It should be understood that, in the method shown in FIG. 6, a base station that serves UE is a source base station. Before the method shown in FIG. 6 is performed, the UE establishes a connection to the source base station, and the UE may report, to the source base station, UE capability information matching the source base station, and the source base station stores the UE capability information. For example, the UE and the source base station can exchange their UE capabilities. The UE can determine, based on the UE capability of the UE and the UE capability supported by the source base station, the UE capability information matching the source base station, and report, to the source base station, the UE capability information matching the source base station. The source base station receives the UE capability information reported by the UE and stores the received UE capability information in a UE context corresponding to the UE.

FIG. 6 is another UE capability reporting method according to an embodiment of this application. As shown in FIG. 6, the method includes the following steps.

Step 600: A source base station determines to hand over UE to a target base station.

Step 600 is the same as step 500. Details are not described again.

Step 601: The source base station sends a handover request (handover request) to the target base station. Correspondingly, the target base station receives the handover request.

The related description of the handover request and the execution process of step 601 are the same as those of step 501. Details are not described again.

Step 602: The target base station determines, based on a UE capability supported by the target base station, a UE capability supported by the source base station, and a UE capability of the UE, whether UE capability information needs to be obtained again. If it is determined that the UE capability information needs to be obtained again, step 603 to step 606 are performed; otherwise, an existing procedure is performed.

Step 602 is the same as step 502. Details are not described again.

Step 603: The target base station sends a handover request acknowledge (handover request acknowledge) to the source base station. Correspondingly, the source base station receives the handover request acknowledge.

For information carried in the handover request acknowledge and the execution process of step 603, refer to the prior art. Details are not described again.

Step 604: The source base station sends an RRC connection reconfiguration (RRC connection reconfiguration) to the UE, and the UE receives the RRC connection reconfiguration and sends an RRC connection reconfiguration complete (RRC connection reconfiguration complete) to the target base station. Correspondingly, the target base station receives the RRC connection reconfiguration complete.

For information carried in the RRC connection reconfiguration, information carried in the RRC connection reconfiguration complete, and the execution process of step 604, refer to the prior art. Details are not described again.

Step 605: The target base station sends a UE capability enquiry request to the UE. Correspondingly, the UE receives the UE capability enquiry request.

The UE capability enquiry request (UE capability enquiry request) may be used to request to enquire the UE capability of the UE, and the UE capability enquiry request may carry first information. The first information may be used to indicate the UE capability supported by the target base station. For example, the first information may include a protocol release number or a protocol release index number of the target base station.

Further, the UE capability enquiry request may further carry fourth information, where the fourth information may be used to indicate the UE capability supported by the source base station. For example, the fourth information may include a protocol release number or a protocol release index number of the source base station.

Further, the UE capability enquiry request may further carry third information, where the third information is used to instruct the UE to report second information. It should be understood that the third information may be carried in the UE capability enquiry request and sent to the UE, or may be carried in a handover request and sent to the source base station, and carried in the RRC connection reconfiguration and sent to the UE by the source base station, or may be carried in another signaling message and sent to the UE, which is not limited.

Step 606: The UE sends, based on the UE capability of the UE and the UE capability supported by the target base station, a UE capability enquiry response carrying the second information to the target base station. Correspondingly, the target base station receives the UE capability enquiry response.

The UE capability enquiry response corresponds to the UE capability enquiry request.

Step 606 may alternatively be described as follows: The UE receives the UE capability enquiry request, obtains the first information from the UE capability enquiry request, determines the second information based on the UE capability of the UE, the UE capability supported by the target base station as indicated by the first information, and the UE capability of the source base station, and sends the UE capability enquiry response carrying the second information to the target base station.

For the process of determining the second information by the UE based on the UE capability of the UE, the UE capability supported by the target base station, and the UE capability supported by the source base station, refer to the description in step 505. Details are not described again.

It should be understood that step 606 is performed conditionally. The conditions may include: 1. After the UE receives the UE capability enquiry request, if the UE obtains the first information from the UE capability enquiry request, the UE needs to report the second information by default and perform step 606. 2. After the UE receives the UE capability enquiry request, in addition to obtaining the first information and other information from the UE capability enquiry request, if the UE also obtains the third information from the UE capability enquiry request, the UE determines, based on the third information, that the second information needs to be reported again, and performs step 606. 3. After the UE receives the UE capability enquiry request, if the fourth information for indicating the UE capability supported by the source base station is obtained from the UE capability enquiry request, the UE needs to report the second information by default and perform step 606.

Further, the target base station receives the UE capability enquiry response, obtains the second information from the UE capability enquiry response, combines the second information and the UE capability information obtained by the target base station from the source base station into complete UE capability information, and stores the complete UE capability information in a UE context in the target base station.

FIG. 6 depicts a process of obtaining the UE capability information again based on UE capability enquiry. In the method shown in FIG. 6, the target base station determines, based on the UE capability of the UE, the UE capability supported by the source base station, and the UE capability supported by the target base station, that the UE capability information needs to be obtained again. After the UE establishes an RRC connection to the target base station, the target base station sends the UE capability enquiry request to the UE. After the UE receives the UE capability enquiry, the UE determines, based on the UE capability supported by the target base station and the UE capability of the UE, different UE capability information in target capability information compared with the UE capability information stored in the source base station, and reports, in a UE capability enquiry procedure, the second information used to indicate the different UE capability information. Therefore, integrity of the UE capability information obtained by the target base station is ensured. In addition, an amount of capability information reported by the UE is smaller. Therefore, power consumption of the UE is reduced, transmission resources are saved, and a reporting rate of the UE capability information is increased.

When the UE is handed over from a source access network device to a target access network device, the target access network device needs to perform admission control on the UE based on a service requirement of the UE and a resource status of the target access network device. Different UE capabilities require different resources for the target access network device. Therefore, before the target access network device performs admission control on the UE, the UE capability information can be obtained from the UE again, and the obtained complete UE capability information can be reported to the target access network in a handover procedure. Specifically, the method may be described in the following embodiment corresponding to FIG. 7.

Figure 7:
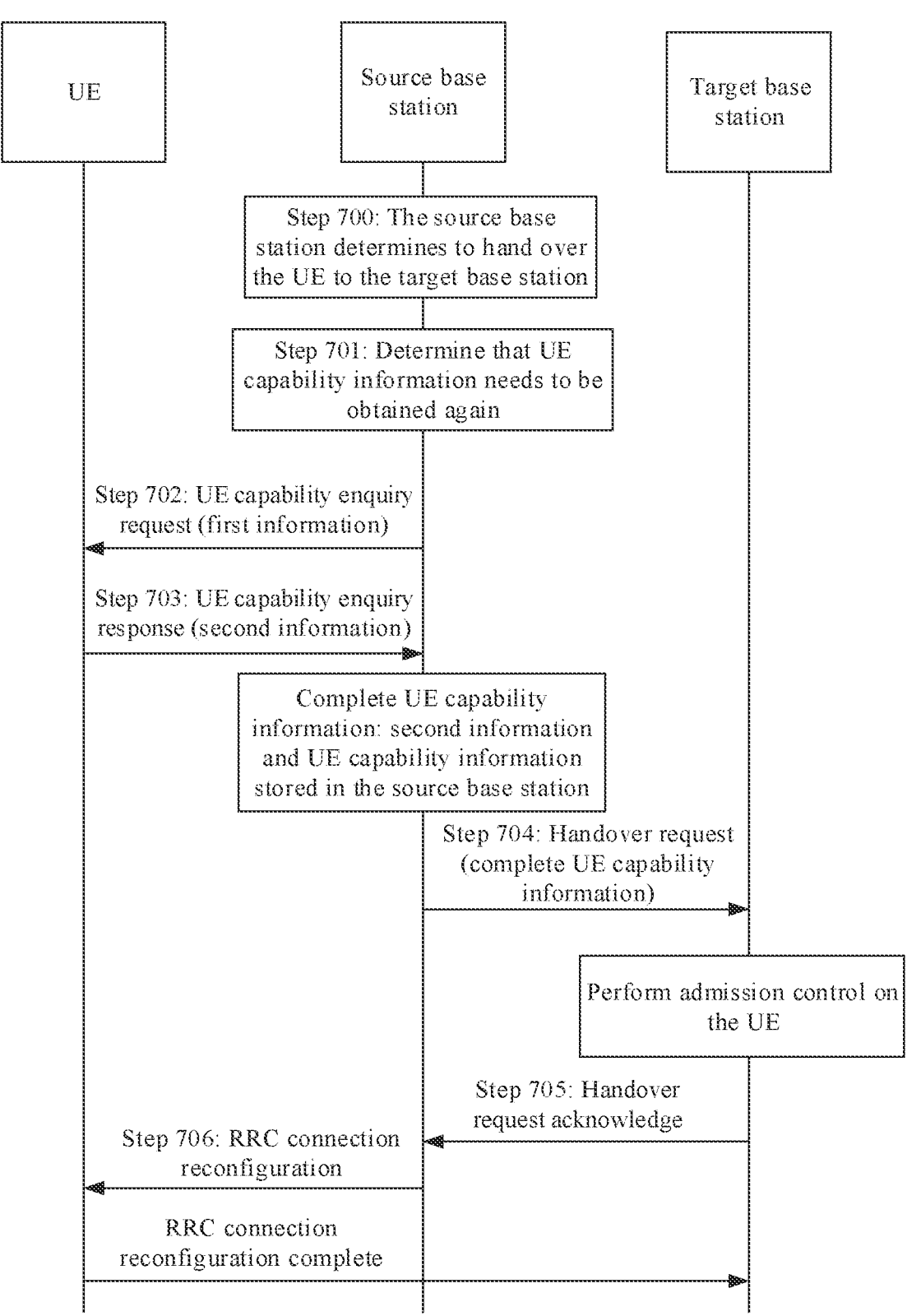
FIG. 7 is a flowchart of another UE capability reporting method according to an embodiment of this application.

It should be understood that, in the method shown in FIG. 7, a base station serving the UE is a source base station. Before the method shown in FIG. 7 is performed, the UE establishes a connection to the source base station, and the UE reports, to the source base station, UE capability information matching the source base station, and the source base station stores the UE capability information. For example, the UE and the source base station can exchange their UE capabilities. The UE can determine, based on the UE capability of the UE and the UE capability supported by the source base station, the UE capability information matching the source base station, and report, to the source base station, the UE capability information matching the source base station. The source base station receives the UE capability information reported by the UE and stores the received UE capability information in a UE context corresponding to the UE.

FIG. 7 is another UE capability reporting method according to an embodiment of this application. As shown in FIG. 7, the method may include the following steps.

Step 700: A source base station determines to hand over UE to a target base station.

Step 700 is the same as step 500. Details are not described again.

Further, the source base station may obtain, from the target base station through an X2 interface or an Xn interface between the source base station and the target base station, first information used to indicate a UE capability supported by the target base station.

Step 701: The source base station determines, based on the UE capability supported by the target base station, a UE capability supported by the source base station, and a UE capability of the UE, whether UE capability information needs to be obtained again. The source base station determines whether to obtain the UE capability information again for the target base station. If the source base station determines that the UE capability information needs to be obtained again, step 702 to step 706 are performed. Conversely, if the source base station determines that the UE capability information does not need to be obtained again, a handover procedure is performed. For example, the source base station adds the UE capability information stored in the source base station to a handover request and sends the handover request to the target base station, or adds UE capability information matching the target base station, in the UE capability information stored in the source base station, to a handover request and sends the handover request to the target base station; and the target base station receives the handover request and sends a handover request acknowledge to the source base station.

For the process of determining whether the source base station needs to obtain the UE capability information again, refer to step 301. Details are not described again.

Step 702: The source base station sends a UE capability enquiry request (UE capability enquiry request) to the UE. Correspondingly, the UE receives the UE capability enquiry request.

The UE capability enquiry request may be used to request to enquire the UE capability of the UE, and the UE capability enquiry request may carry the first information. The first information may be used to indicate the UE capability supported by the target base station. For example, the first information may include a protocol release number or a protocol release index number of the target base station.

Further, the UE capability enquiry request may further carry fourth information, where the fourth information may be used to indicate the UE capability supported by the source base station. For example, the fourth information may include a protocol release number or a protocol release index number of the source base station.

Further, the UE capability enquiry request may further carry third information, where the third information is used to instruct the UE to report second information. It should be understood that the third information may be carried in the UE capability enquiry request and sent to the UE, or may be carried in a handover request and sent to the source base station, and carried in an RRC connection reconfiguration and sent to the UE by the source base station, or may be carried in another signaling message and sent to the UE, which is not limited.

Step 703: The UE sends, based on the UE capability of the UE and the UE capability supported by the target base station, a UE capability enquiry response carrying the second information to the source base station. Correspondingly, the source base station receives the UE capability enquiry response.

The UE capability enquiry response corresponds to the UE capability enquiry request.

Step 703 may alternatively be described as follows: The UE receives the UE capability enquiry request, obtains the first information from the UE capability enquiry request, determines the second information based on the UE capability of the UE, the UE capability supported by the target base station as indicated by the first information, and the UE capability of the source base station, and sends the UE capability enquiry response carrying the second information to the target base station.

For the processes of determining the second information by the UE based on the UE capability of the UE, the UE capability supported by the target base station, and the UE capability supported by the source base station, refer to the description in step 505. Details are not described again.

It should be understood that step 703 is performed conditionally. The conditions may include: 1. After the UE receives the UE capability enquiry request, if the UE obtains the first information from the UE capability enquiry request, the UE needs to report the second information by default and perform step 703. 2. After the UE receives the UE capability enquiry request, in addition to obtaining the first information and other information from the UE capability enquiry request, if the UE also obtains the third information from the UE capability enquiry request, the UE determines, based on the third information, that the second information needs to be reported again, and performs step 703. 3. After the UE receives the UE capability enquiry request, if the fourth information for indicating the UE capability supported by the source base station is obtained from the UE capability enquiry request, the UE needs to report the second information by default and perform step 703.

Step 704: The source base station obtains the second information from the UE capability enquiry response, combines the second information and the UE capability information stored in the source base station into complete UE capability information, adds the complete UE capability information to the handover request (handover request), and sends the handover request to the target base station. Correspondingly, the target base station receives the complete UE capability information.

It should be understood that, in addition to carrying the complete UE capability information, the handover request may also carry other information, such as a service requirement of the UE, which is not limited.

Step 705: The target base station performs admission control on the UE based on a resource status of the target base station, the complete UE capability information sent by the source base station, and the service requirement of the UE. After successful admission control, the target base station sends a handover request acknowledge (handover request acknowledge) to the source base station.

For the process of performing admission control on the UE by the target base station in step 705, refer to the prior art. Details are not described again.

Step 706: The source base station receives the handover request acknowledge and sends an RRC connection reconfiguration (RRC connection reconfiguration) to the UE, and the UE receives the RRC connection reconfiguration and sends an RRC connection reconfiguration complete (RRC connection reconfiguration complete) to the target base station.

FIG. 7 depicts a process of obtaining the UE capability information again based on UE capability enquiry and handover procedures. In the method shown in FIG. 7, the source base station determines, based on the UE capability of the UE, the UE capability supported by the source base station, and the UE capability supported by the target base station, that the UE capability information needs to be obtained again, and sends the UE capability enquiry request to the UE. After the UE receives the UE capability enquiry, the UE determines, based on the UE capability supported by the target base station and the UE capability of the UE, different UE capability information in target capability information compared with the UE capability information stored in the source base station, and reports, to the source base station in a UE capability enquiry procedure, the second information used to indicate the different UE capability information, so that the source base station sends the second information and the UE capability information stored in the source base station to the target base station as the complete UE capability information. Therefore, integrity of the UE capability information obtained by the target base station is ensured. In addition, an amount of capability information reported by the UE to the source base station is smaller. Therefore, power consumption of the UE is reduced, transmission resources are saved, and a reporting rate of the UE capability information is increased.

The solutions provided in the embodiments of this application have been described above mainly from a perspective of each node. It may be understood that, to implement the foregoing functions, each node such as a network device or a terminal includes a corresponding hardware structure and/or software module for performing each function. A person skilled in the art should be easily aware that algorithm steps in the examples described with reference to embodiments disclosed in this specification can be implemented by hardware, software, or a combination of hardware and computer software in the methods in the embodiments of this application. Whether a function is performed by hardware or by hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device or terminal may be divided into functional modules based on the foregoing method examples. For example, the functional modules may be obtained through division in a one-to-one correspondence with the functions, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner in an actual implementation.

Figure 8:
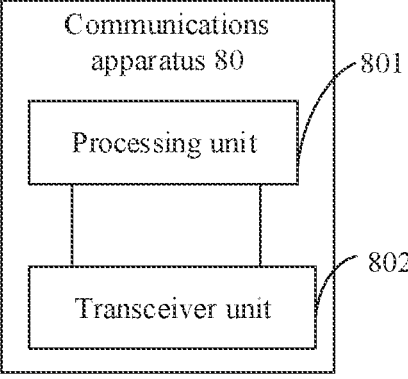
FIG. 8 is a schematic diagram of composition of a communications apparatus 80 according to an embodiment of this application.

FIG. 8 shows a structural diagram of a communications apparatus. The communications apparatus 80 may be UE or a chip or system-on-chip in UE, or another apparatus that can implement the function of the UE in the foregoing method, or the like. The communications apparatus 80 may be configured to perform the function of the UE in the foregoing method embodiment. In a possible implementation, the communications apparatus 80 shown in FIG. 8 includes a processing unit 801 and a transceiver unit 802.

The processing unit 801 is configured to control the transceiver unit 802 to obtain first information used to indicate a UE capability supported by a target access network device. For example, the processing unit 801 may support the communications apparatus 80 in performing step 302, step 504, step 605, and step 702.

The processing unit 801 is further configured to control the transceiver unit 802 to report second information based on the UE capability supported by the target access network device and a UE capability of the UE, where the second information includes capability information, other than UE capability information stored in a source access network device, in target capability information, and the target capability information is UE capability information of a lower UE capability in the UE capability of the UE and the UE capability supported by the target access network device. For example, the transceiver unit 802 may support the communications apparatus 80 in performing step 303, step 505, step 606, and step 703.

Specifically, all related content of steps in the foregoing method embodiments shown in FIG. 3 to FIG. 7 may be cited in function descriptions of corresponding functional modules. Details are not described herein again. The communications apparatus 80 is configured to perform the functions of the UE in the UE capability reporting methods shown in FIG. 3 to FIG. 7, and therefore can achieve the same effects as the foregoing UE capability reporting methods.

In another possible implementation, the communications apparatus 80 shown in FIG. 8 includes a processing module and a communications module. The processing module is configured to control and manage actions of the communications apparatus 80. For example, the processing module may integrate the function of the processing unit 801, and may be configured to support the communications apparatus 80 in performing step 302, step 504, step 605, and step 702, and other processes in the technology described in this specification. The communications module may integrate the function of the transceiver unit 802, and may be configured to support the communications apparatus 80 in performing steps such as step 303, step 505, step 606, and step 703, and communication with another network entity, for example, communication with a functional module or network entity shown in FIG. 1. The communications apparatus 80 may further include a storage module, configured to store an instruction and/or data. When the instruction is executed by the processing module, the processing module may be enabled to implement the foregoing method on the UE side.

The processing module may be a processor, a controller, a module, or a circuit. The processing module may implement or execute various exemplary logical blocks described with reference to the disclosure of this application. The communications module may be a transceiver circuit, a pin, an interface circuit, a bus interface, a communications interface, or the like. The storage module may be a memory. When the processing module is a processor, and the communications module is a communications interface, and the storage module is a memory, the communications apparatus 80 in this embodiment of this application may be the communications apparatus shown in FIG. 2.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. Steps of the methods disclosed with reference to the embodiments of this application may be directly performed and completed by using a hardware processor, or may be performed and completed by using a combination of hardware in the processor and a software module.

In this embodiment of this application, the memory may be a non-volatile memory, for example, a hard disk drive (hard disk drive, HDD) or a solid state drive (solid-state drive, SSD), or may be a volatile memory (volatile memory), such as a random access memory (random-access memory, RAM). The memory is but not limited to any other medium that can be used to carry or store desired program code in a form of an instruction or a data structure and can be accessed by a computer. The memory in this embodiment of this application may alternatively be a circuit or any other apparatus that can implement a storage function, and is configured to store an instruction and/or data.

Figure 9:
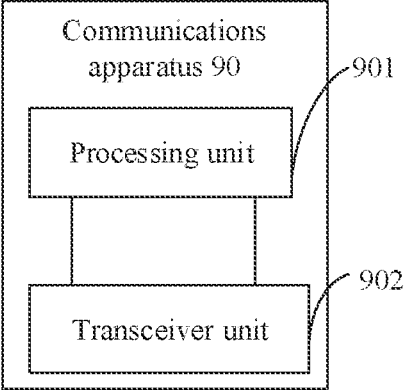
FIG. 9 is a schematic diagram of composition of a communications apparatus 90 according to an embodiment of this application.

FIG. 9 shows a structural diagram of a communications apparatus 90. The communications apparatus 90 may be a source access network device, or a chip or system-on-chip in a source access network device, or another apparatus that can implement the function of the source access network device in the foregoing method, or the like. The communications apparatus 90 may be configured to perform the function of the source access network device in the foregoing method embodiment. In a possible implementation, the communications apparatus 90 shown in FIG. 9 includes a processing unit 901 and a transceiver unit 902.

The processing unit 901 is configured to control the transceiver unit 902 to send first information used to indicate a UE capability supported by a target access network device to UE, so that the UE reports second information based on the UE capability supported by the target access network device and a UE capability of the UE, where the second information includes capability information, other than UE capability information stored in the source access network device, in target capability information. For example, the processing unit 901 and the transceiver unit 902 may support the communications apparatus 90 in performing step 504 and step 702.

In an example, the processing unit 901 is configured to control the transceiver unit 902 to send an RRC connection reconfiguration carrying the first information to the UE.

In another example, the processing unit 901 is configured to control the transceiver unit 902 to send a UE capability enquiry request carrying the first information to the UE. Further, the processing unit 901 further controls the transceiver unit 902 to receive a UE capability enquiry response sent by the UE, where the UE capability enquiry response carries the second information, and to send a handover request carrying the second information and the UE capability information stored in the source access network device to the target access network device. Specifically, all related content of steps in the foregoing method embodiments shown in FIG. 3 to FIG. 7 may be cited in function descriptions of corresponding functional modules. Details are not described herein again. The communications apparatus 90 is configured to perform the functions of the source access network device in the UE capability reporting methods shown in FIG. 3 to FIG. 7, and therefore can achieve the same effects as the foregoing UE capability reporting methods.

In another possible implementation, the communications apparatus 90 shown in FIG. 9 includes a processing module and a communications module. The processing module is configured to control and manage actions of the communications apparatus 90. For example, the processing module may integrate the function of the processing unit 901, and may be configured to support the communications apparatus 90 in performing step 500, step 503 and step 504, step 600, step 601, step 603 and step 604, step 700 to step 706, and other processes in the technology described in this specification. The communications module may integrate the function of the transceiver unit 902, and may be configured to support the communications apparatus 90 in performing steps such as step 503 and step 504, step 601, step 603 and step 604, step 702 to step 706, and communication with another network entity, for example, communication with a functional module or network entity shown in FIG. 1. The communications apparatus 90 may further include a storage module, configured to store an instruction and/or data. When the instruction is executed by the processing module, the processing module may be enabled to implement the foregoing method on the source access network device side.

The processing module may be a processor, a controller, a module, or a circuit. The processing module may implement or execute various exemplary logical blocks described with reference to the disclosure of this application. The communications module may be a transceiver circuit, a pin, an interface circuit, a bus interface, a communications interface, or the like. The storage module may be a memory. When the processing module is a processor, and the communications module is a communications interface, and the storage module is a memory, the communications apparatus 90 in this embodiment of this application may be the communications apparatus shown in FIG. 2.

Figure 10:
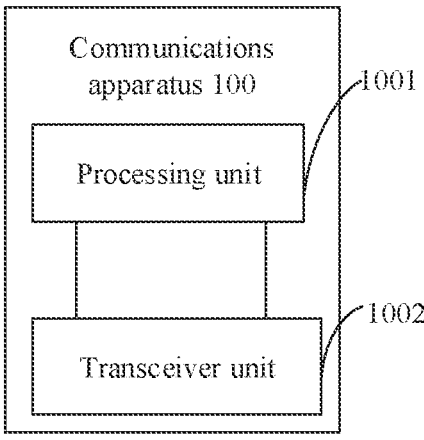
FIG. 10 is a schematic diagram of composition of a communications apparatus 100 according to an embodiment of this application.

FIG. 10 shows a structural diagram of a communications apparatus 100. The communications apparatus 100 may be a target access network device, or a chip or system-on-chip in a target access network device, or another apparatus that can implement the function of the target access network device in the foregoing method, or the like. The communications apparatus 100 may be configured to perform the function of the target access network device in the foregoing method embodiment. In a possible implementation, the communications apparatus 100 shown in FIG. 10 includes a processing unit 1001 and a transceiver unit 1002.

In an example, the processing unit 1001 is configured to control the transceiver unit 1002 to send first information used to indicate a UE capability supported by the target access network device, and to receive second information from UE. For example, the processing unit 1001 and the transceiver unit 1002 may support the communications apparatus 100 in performing step 503, step 505, and step 605 and step 606.

In another example, the processing unit 1001 is configured to control the transceiver unit 1002 to receive a handover request from a source access network device, where the handover request carries second information and UE capability information stored in the source access network device, and to send a handover request acknowledge to the source access network device. For example, the processing unit 1001 and the transceiver unit 1002 may support the communications apparatus 100 in performing step 704 and step 705.

Specifically, all related content of steps in the foregoing method embodiments shown in FIG. 3 to FIG. 7 may be cited in function descriptions of corresponding functional modules. Details are not described herein again. The communications apparatus 100 is configured to perform the functions of the target access network device in the methods shown in FIG. 3 to FIG. 7, and therefore can achieve the same effects as the foregoing UE capability reporting methods.

In another possible implementation, the communications apparatus 100 shown in FIG. 10 includes a processing module and a communications module. The processing module is configured to control and manage actions of the communications apparatus 100. For example, the processing module may integrate the function of the processing unit 1001, and may be configured to support the communications apparatus 100 in performing an action other than the receiving and sending actions of the target access network device described in this specification. The communications module may integrate the function of the transceiver unit 1002, and may be configured to support the communications apparatus 100 in performing step 503, step 505, step 605 and step 606, step 704 and step 705, and communication with another network entity, for example, communication with a functional module or network entity shown in FIG. 1. The communications apparatus 100 may further include a storage module, configured to store an instruction and/or data of the communications apparatus 100. When the instruction is executed by the processing module, the processing module may be enabled to implement the foregoing method on the terminal side.

The processing module may be a processor, a controller, a module, or a circuit. The processing module may implement or execute various exemplary logical blocks described with reference to the disclosure of this application. The processor may alternatively be a combination that implements a computing function, such as a combination of one or more microprocessors, or a combination of a DSP and a microprocessor. The communications module may be a transceiver circuit, a pin, an interface circuit, a bus interface, a communications interface, or the like. The storage module may be a memory. When the processing module is a processor, and the communications module is a communications interface, and the storage module is a memory, the communications apparatus 100 may be the communications apparatus shown in FIG. 2.

Figure 11:
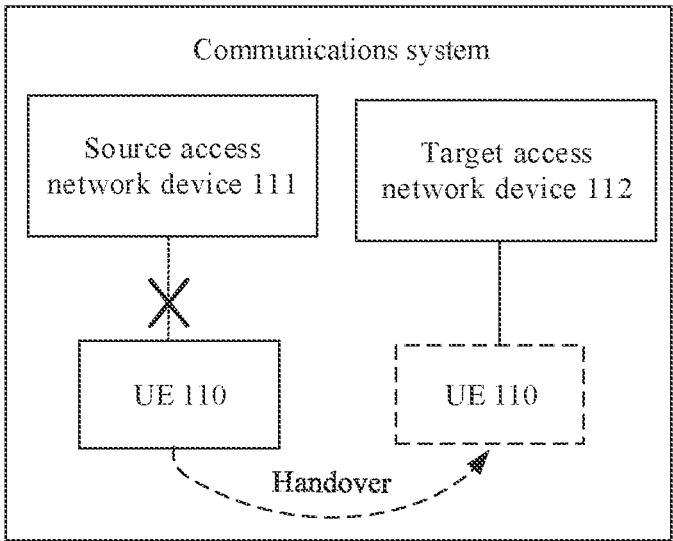
FIG. 11 is a schematic diagram of composition of a communications system according to an embodiment of this application.

FIG. 11 is a structural diagram of a communications system according to an embodiment of this application. As shown in FIG. 11, the communications system may include UE 110, a source access network device 111, and a target access network device 112.

The UE 110 may have the function of the foregoing communications apparatus 80. The source access network device 111 may have the function of the foregoing communications apparatus 90. The target access network device 112 may have the function of the foregoing communications apparatus 100.

In an example, the target access network device 112 is configured to send a handover request acknowledge to the source access network device 111, where the handover request acknowledge carries first information; the source access network device Ill is configured to send a radio resource control RRC connection reconfiguration to the UE 110; the UE 110 is configured to receive the RRC connection reconfiguration from the source access network device 111, where the RRC connection reconfiguration carries the first information; the UE 110 is configured to send an RRC connection reconfiguration complete to the target access network device 112; and the target access network device 112 is configured to receive the RRC connection reconfiguration complete from the UE 110, where the RRC connection reconfiguration complete carries second information.

In another example, the target access network device 112 is configured to send a UE 110 capability enquiry request to the UE 110; the UE 110 is configured to receive the UE 110 capability enquiry request from the target access network device 112, and send a UE 110 capability enquiry response to the target access network device 112; and the target access network device 112 is configured to receive the UE 110 capability enquiry response from the UE 110, where the UE 110 capability enquiry response carries second information.

In still another example, the source access network device 111 is configured to send a UE 110 capability enquiry request to the UE 110; the UE 110 is configured to receive the UE 110 capability enquiry request from the source access network device 111, where the UE 110 capability enquiry request carries first information; the UE 110 is configured to send a UE 110 capability enquiry response to the source access network device 111; the source access network device 111 is further configured to receive the UE 110 capability enquiry response from the UE 110, where the UE 110 capability enquiry response carries second information; the source access network device 111 is further configured to send a handover request to the target access network device 112, where the handover request carries the second information and UE 110 capability information stored in the source access network device 111; and the target access network device 112 is configured to receive the handover request from the target access network device 112, and send a handover request acknowledge to the source access network device 111.

Specifically, for a specific implementation process of the UE 110, refer to the execution process of the UE in the foregoing method embodiments in FIG. 3 to FIG. 7. For a specific implementation process of the source access network device 111, refer to the execution process of the source access network device in the foregoing method embodiments in FIG. 3 to FIG. 7. For a specific implementation process of the target access network device 112, refer to the execution process of the target access network device in the foregoing method embodiments in FIG. 3 to FIG. 7. Details are not described herein again.

An embodiment of this application further provides a computer-readable storage medium. All or a part of the procedures in the foregoing method embodiments may be implemented by related hardware instructed by a computer program. The program may be stored in the foregoing computer-readable storage medium, and when the program is executed, the procedures in the foregoing method embodiments may be included. The computer-readable storage medium may be an internal storage unit of a terminal apparatus including a data transmit end and/or a data receive end in any one of the foregoing embodiments, for example, a hard disk or a memory of the terminal apparatus. Alternatively, the computer-readable storage medium may be an external storage device of the terminal apparatus, for example, a removable hard disk configured on the terminal apparatus, a smart memory card (smart media card, SMC), a secure digital (secure digital, SD) card, or a flash memory card (flash card). Further, the computer-readable storage medium may further include both the internal storage unit of the terminal apparatus and the external storage device. The computer-readable storage medium is configured to store the computer program and another program and data required by the terminal apparatus. The computer-readable storage medium may be further configured to temporarily store data that is already output or will be output.

An embodiment of this application further provides a computer instruction. All or a part of the procedures in the foregoing method embodiments may be implemented by related hardware (for example, a computer, a processor, a network device, and a terminal) instructed by the computer instruction. The program may be stored in the foregoing computer-readable storage medium.

It should be noted that, in the specification, claims, and drawings of this application, the terms such as "first" and "second" are intended to distinguish between different objects, and not used to describe a specific order of the objects. In addition, the terms "include", "have", and any other variant thereof are intended to cover a non-exclusive inclusion. For example, a process, method, system, product, or device that includes a list of steps or units is not limited to the listed steps or units, but optionally includes steps or units not listed, or optionally includes other steps or units inherent to the process, method, product, or device.

It should be understood that, in this application, "at least one (item)" means one or more; "plurality" means two or more; "at least two (items)" means two, three, or more; and "and/or" is used to describe an association relationship between associated objects, and indicates that three relationships may exist. For example. "A and/or B" may indicate the following three cases: Only A exists, only B exists, and both A and B exist, where A and B may be singular or plural. The character "/" generally indicates an "or" relationship between associated objects. "At least one of the following" or a similar expression thereof indicates any combination of the following, and includes any combination of one or more of the following. For example, at least one of a, b, or c may indicate: a, b, c, "a and b", "a and c", "b and c", or "a and b and c", where a, b, and c may be singular or plural.

It should be understood that, in the embodiments of this application, "B corresponding to A" indicates "B associated with A". For example, B may be determined based on A. It should also be understood that determining B based on A does not mean determining B only based on A. Alternatively, B may be determined based on A and/or other information.

In addition, the term "connection" in the embodiments of this application refers to various connection modes such as direct connection or indirect connection, to implement communication between devices. This is not limited in the embodiments of this application.

Unless otherwise specified, "transmission" (transmit/transmission) in the embodiments of this application refers to bidirectional transmission, including actions of sending and/or receiving. Specifically, "transmission" in the embodiments of this application includes sending data, receiving data, and/or sending data and receiving data. In other words, the data transmission herein includes uplink and/or downlink data transmission. The data may include a channel and/or a signal, uplink data transmission is uplink channel transmission and/or uplink signal transmission, and downlink data transmission is downlink channel transmission and/or downlink signal transmission. The terms "network" and "system" in the embodiments of this application express the same concept, and a communications system is a communications network.

Based on the description of the foregoing implementations, a person skilled in the art may clearly understand that, for the purpose of convenient and brief description, division of the foregoing functional modules is used as an example for description. In an actual application, the foregoing functions may be allocated to different functional modules and implemented based on a requirement, that is, an internal structure of the apparatus is divided into different functional modules to implement all or a part of the functions described above.

In the several embodiments provided in this application, it should be understood that the disclosed apparatus and method may be implemented in other manners. For example, the described apparatus embodiments are merely examples. For example, the division of modules or units is merely logical function division and may be other division in actual implementation. For example, a plurality of units or components may be combined or integrated into another apparatus, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may be one physical unit or a plurality of physical units, that is, the parts may be located in one position or distributed in a plurality of different positions. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or a part of the technical solutions may be implemented in a form of a software product. The software product is stored in a storage medium and includes several instructions for instructing a device, for example, a single-chip microcomputer, a chip, or a processor (processor) to perform all or a part of the steps of the method described in each embodiment of this application. The foregoing storage medium includes: any medium that can store program code, such as a USB flash drive, a removable hard disk, a ROM, a RAM, a magnetic disk, or an optical disc.

The foregoing is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A user equipment UE capability reporting method, wherein the method comprises:

obtaining, by UE, first information, wherein the first information is used to indicate a UE capability supported by a target access network device;

reporting, by the UE, second information based on the UE capability supported by the target access network device and a UE capability of the UE, wherein the second information comprises capability information which is absent of UE capability information stored in a source access network device in target capability information, and wherein the target capability information is UE capability information of a lower UE capability in the UE capability of the UE and the UE capability supported by the target access network device; and receiving, by the UE, a UE capability enquiry request from the target access network device, wherein the UE capability enquiry request carries the first information and information indicating the UE capability supported by the source access network device.

2. The method according to claim 1, wherein the method further comprises:

when the UE capability of the UE is higher than a UE capability supported by the source access network device and the UE capability supported by the target access network device is higher than the UE capability supported by the source access network device, determining, by the UE, to report the second information.

3. The method according to claim 1, wherein the method further comprises:

receiving, by the UE, third information, wherein the third information is used to instruct the UE to report the second information.

4. The method according to claim 1, wherein the method further comprises:

receiving, by the UE, a radio resource control (RRC) connection reconfiguration from the source access network device, wherein the RRC connection reconfiguration carries the first information; and the reporting, by the UE, second information comprises: sending, by the UE, an RRC connection reconfiguration complete to the target access network device, wherein the RRC connection reconfiguration complete carries the second information.

5. The method according to claim 1, wherein the reporting, by the UE, second information comprises: sending, by the UE, a UE capability enquiry response to the target access network device, wherein the UE capability enquiry response carries the second information.

6. The method according to claim 1, wherein the method further comprises:

receiving, by the UE, a UE capability enquiry request from the source access network device, wherein the UE capability enquiry request carries the first information; and the reporting, by the UE, second information comprises: sending, by the UE, a UE capability enquiry response to the source access network device, wherein the UE capability enquiry response carries the second information.

7. A communications system, wherein the communications system comprises user equipment UE, a target access network device, and a source access network device, wherein the UE is configured to obtain first information, wherein the first information is used to indicate a UE capability supported by the target access network device;

the UE is configured to report second information based on the UE capability supported by the target access network device and a UE capability of the UE, wherein the second information comprises capability information which is absent of UE capability information stored in a source access network device in target capability information, and wherein the target capability information is UE capability information of a lower UE capability in the UE capability of the UE and the UE capability supported by the target access network device; and receiving a UE capability enquiry request from the target access network device, wherein the UE capability enquiry request carries the first information and information indicating the UE capability supported by the source access network device.

8. The communications system according to claim 7, wherein the target access network device is configured to send a handover request acknowledge to the source access network device, wherein the handover request acknowledge carries the first information;

the source access network device is configured to send a radio resource control (RRC) connection reconfiguration to the UE;

that the UE is configured to obtain first information comprises: the UE is configured to receive the RRC connection reconfiguration from the source access network device, wherein the RRC connection reconfiguration carries the first information;

that the UE is configured to report second information comprises: the UE sends an RRC connection reconfiguration complete to the target access network device; and the target access network device is configured to receive the RRC connection reconfiguration complete from the UE, wherein the RRC connection reconfiguration complete carries the second information.

9. The communications system according to claim 7, wherein the target access network device is configured to send a UE capability enquiry request to the UE;

that the UE is configured to obtain first information comprises: the UE is configured to receive the UE capability enquiry request from the target access network device, wherein the UE capability enquiry request carries the first information;

that the UE is configured to report second information comprises: the UE sends a UE capability enquiry response to the target access network device; and the target access network device is further configured to receive the UE capability enquiry response from the UE, wherein the UE capability enquiry response carries the second information.

10. The communications system according to claim 7, wherein the source access network device is configured to send a UE capability enquiry request to the UE;

that the UE is configured to obtain first information comprises: the UE is configured to receive the UE capability enquiry request from the source access network device, wherein the UE capability enquiry request carries the first information;

that the UE is configured to report second information comprises: the UE sends a UE capability enquiry response to the source access network device;

the source access network device is further configured to receive the UE capability enquiry response from the UE, wherein the UE capability enquiry response carries the second information;

the source access network device is further configured to send a handover request to the target access network device, wherein the handover request carries the second information and the UE capability information stored in the source access network device; and the target access network device is configured to receive the handover request from the source access network device, and send a handover request acknowledge to the source access network device.

11. User equipment UE, wherein the UE comprises a processor and a communications interface, and the processor and the communications interface are configured to support the UE in performing a method, wherein the method comprises:

obtaining first information, wherein the first information is used to indicate a UE capability supported by a target access network device;

reporting second information based on the UE capability supported by the target access network device and a UE capability of the UE, wherein the second information comprises capability information which is absent of UE capability information stored in a source access network device in target capability information, and wherein the target capability information is UE capability information of a lower UE capability in the UE capability of the UE and the UE capability supported by the target access network device; and receiving a UE capability enquiry request from the target access network device, wherein the UE capability enquiry request carries the first information and information indicating the UE capability supported by the source access network device.

12. The UE according to claim 11, wherein the method further comprises:

when the UE capability of the UE is higher than a UE capability supported by the source access network device and the UE capability supported by the target access network device is higher than the UE capability supported by the source access network device, determining to report the second information.

13. The UE according to claim 11, wherein the method further comprises:

receiving third information, wherein the third information is used to instruct the UE to report the second information.

14. The UE according to claim 11, wherein the method further comprises:

receiving a radio resource control (RRC) connection reconfiguration from the source access network device, wherein the RRC connection reconfiguration carries the first information; and the reporting second information comprises: sending an RRC connection reconfiguration complete to the target access network device, wherein the RRC connection reconfiguration complete carries the second information.

15. The UE according to claim 11, wherein the reporting second information comprises: sending a UE capability enquiry response to the target access network device, wherein the UE capability enquiry response carries the second information.

16. The UE according to claim 11, wherein the method further comprises:

receiving a UE capability enquiry request from the source access network device, wherein the UE capability enquiry request carries the first information; and the reporting second information comprises: sending a UE capability enquiry response to the source access network device, wherein the UE capability enquiry response carries the second information.

* * * * *